(12) United States Patent
Hiroki

(10) Patent No.: US 9,818,238 B2
(45) Date of Patent: Nov. 14, 2017

(54) VEHICLE STATE PREDICTION SYSTEM

(71) Applicant: TOYOTA JIDOSHA KABUSHIKI KAISHA, Toyota-shi, Aichi-ken (JP)

(72) Inventor: Daisuke Hiroki, Toda (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/992,111

(22) Filed: Jan. 11, 2016

(65) Prior Publication Data
US 2016/0225201 A1 Aug. 4, 2016

(30) Foreign Application Priority Data

Feb. 2, 2015 (JP) ................. 2015-018809

(51) Int. Cl.
| | | |
|---|---|---|
| *G01C 21/12* | (2006.01) | |
| *G01C 21/10* | (2006.01) | |
| *G07C 5/02* | (2006.01) | |
| *B60W 50/00* | (2006.01) | |
| *B60W 50/06* | (2006.01) | |

(Continued)

(52) U.S. Cl.
CPC ............ *G07C 5/02* (2013.01); *B60W 50/0097* (2013.01); *B60W 50/06* (2013.01); *G07C 5/08* (2013.01); *H04L 67/12* (2013.01); *B60W 2050/0014* (2013.01); *B60W 2050/0026* (2013.01);

(Continued)

(58) Field of Classification Search
CPC ............. B60W 2550/12; B60W 30/06; B60W 40/105; B60W 50/08; B60W 2050/146; B60W 40/06; B60W 2050/0095; B60W 2550/308; B60W 2550/148; B60W 2550/404; B60W 2050/0089; B60R 2300/8086; B60R 2300/304; B60R 2300/8093; B60R 2300/202; G07C 5/0808; G07C 5/006; G07C 5/0816; H04L 1/0026; H04L 65/4076; H04L 67/26; H04L 5/0057
USPC ....... 701/1, 36, 41, 532, 93, 96, 117, 26, 48, 701/25
See application file for complete search history.

(56) References Cited

U.S. PATENT DOCUMENTS 6,453,281 B1 * 9/2002 Walters ................. G06F 3/0481
704/200
7,360,615 B2 * 4/2008 Salman .................... B60K 6/52
180/65.265

(Continued)

FOREIGN PATENT DOCUMENTS

| JP | 09-42987 A | 2/1997 |
|---|---|---|
| JP | 2003-252130 A | 9/2003 |

(Continued)

*Primary Examiner* — Jelani Smith
*Assistant Examiner* — Luis A Martinez Borrero
(74) *Attorney, Agent, or Firm* — Sughrue Mion, PLLC

(57) ABSTRACT

A state predicting circuitry predicts a route showing a future change in the vehicle state from among a plurality of routes from a first node to a second node. The first node corresponds to the current vehicle state. The second node corresponds to the vehicle state after having transitioned a predetermined number of times from the first node. The state predicting circuitry predicts a route in which at least one of an accumulated value of the node that exists in the routes and an accumulated value of the link that exists in the routes is greatest, from among the plurality of routes.

21 Claims, 20 Drawing Sheets

(51) Int. Cl.
*G07C 5/08* (2006.01)
*H04L 29/08* (2006.01)

(52) U.S. Cl.
CPC ............... *B60W 2050/0089* (2013.01); *B60W 2050/0095* (2013.01)

(56) References Cited

U.S. PATENT DOCUMENTS

| | | | |
|---|---|---|---|
| 8,271,175 B2* | 9/2012 | Takenaka | B60T 8/17551 701/70 |
| 8,364,390 B2 | 1/2013 | Harada et al. | |
| 8,489,317 B2* | 7/2013 | Caveney | B60W 30/08 701/301 |
| 8,548,806 B2 | 10/2013 | Nagashima | |
| 2003/0167112 A1 | 9/2003 | Akiyama | |
| 2005/0027447 A1* | 2/2005 | Hirose | G01C 21/3492 701/423 |
| 2007/0208498 A1* | 9/2007 | Barker | G08G 1/0104 701/117 |
| 2009/0088918 A1* | 4/2009 | Takenaka | B60T 8/17551 701/31.4 |
| 2009/0234467 A1 | 9/2009 | Sabe et al. | |
| 2010/0076685 A1* | 3/2010 | Eidehall | G01S 13/931 701/301 |
| 2010/0106603 A1* | 4/2010 | Dey | G01C 21/3484 705/14.63 |
| 2010/0262408 A1* | 10/2010 | Taguchi | B60W 50/0098 703/8 |
| 2011/0054793 A1* | 3/2011 | Harada | G08G 1/096725 701/301 |
| 2011/0106368 A1* | 5/2011 | Miura | B60W 40/12 701/31.4 |
| 2011/0109473 A1* | 5/2011 | Fujimoto | B60K 35/00 340/901 |
| 2011/0112997 A1* | 5/2011 | Sabe | G06N 99/005 706/12 |
| 2011/0153202 A1* | 6/2011 | Sengoku | G01C 21/3469 701/533 |
| 2012/0022764 A1* | 1/2012 | Tang | B60W 10/06 701/102 |
| 2012/0072104 A1* | 3/2012 | Sakai | B60W 30/09 701/400 |
| 2013/0046466 A1* | 2/2013 | Yucel | G01C 21/3469 701/538 |
| 2013/0173150 A1* | 7/2013 | Ghisio | G01C 21/26 701/423 |
| 2013/0179382 A1 | 7/2013 | Fritsch et al. | |
| 2013/0261914 A1* | 10/2013 | Ingram | B64C 39/024 701/70 |
| 2013/0261966 A1* | 10/2013 | Wang | G01C 21/3469 701/533 |
| 2013/0262013 A1* | 10/2013 | Ide | G01S 19/34 702/104 |
| 2015/0142205 A1* | 5/2015 | Harsham | B60W 50/0097 701/1 |
| 2015/0166072 A1* | 6/2015 | Powers | B60W 40/06 701/1 |
| 2015/0170044 A1* | 6/2015 | Jin | G06F 17/30752 706/12 |
| 2015/0275788 A1* | 10/2015 | Dufford | F02D 29/02 701/102 |
| 2016/0153796 A1* | 6/2016 | Stankoulov | G01C 21/3469 701/123 |

FOREIGN PATENT DOCUMENTS

| | | |
|---|---|---|
| JP | 2007-058344 A | 3/2007 |
| JP | 2008-70805 A | 3/2008 |
| JP | 2009-067375 A | 4/2009 |
| JP | 2009-223445 A | 10/2009 |
| JP | 2011-48470 A | 3/2011 |
| JP | 2011-123869 A | 6/2011 |
| JP | 2013-143134 A | 7/2013 |
| JP | 2013-205170 A | 10/2013 |
| JP | 2013-250663 A | 12/2013 |

* cited by examiner

Fig.4

| State number (Node ID) | Group of vehicle signals | | | | | Count value |
|---|---|---|---|---|---|---|
| | Vehicle signal 1 | Vehicle signal 2 | Vehicle signal 3 | ... | Vehicle signal α | |
| S1 | A11 | A12 | A13 | ... | A1α | NS1 |
| S2 | A21 | A22 | A23 | ... | A2α | NS2 |
| S3 | A31 | A32 | A33 | ... | A3α | NS3 |
| ⋮ | ⋮ | ⋮ | ⋮ | ⋮ | ⋮ | ⋮ |
| Sm | Am1 | Am2 | Am3 | ... | Amα | NSm |

Fig.5

| Link ID | Start terminal node ID | End terminal node ID | Count value |
|---|---|---|---|
| L11 | 1 | 1 | NL11 |
| L12 | 1 | 2 | NL12 |
| ⋮ | ⋮ | ⋮ | ⋮ |
| Lmn | m | n | NLmn |

Fig.8

| Link ID | Start terminal node ID | End terminal node ID | Count value | Voice recognition operation |
|---|---|---|---|---|
| L11 | 1 | 1 | NL11 | × |
| L12 | 1 | 2 | NL12 | × |
| ⋮ | ⋮ | ⋮ | ⋮ | ⋮ |
| Lmn | m | n | NLmn | ○ |

Fig.11

| Service | Service start-up condition | | | | | Vehicle state that has undergone service execution | | | |
|---|---|---|---|---|---|---|---|---|---|
| | Vehicle signal 1 | Vehicle signal 2 | Vehicle signal 3 | ... | Vehicle signal α | Vehicle signal 1 | Vehicle signal 2 | ... | Vehicle signal 3 |
| Service A | Sb11 | — | Sb13 | ... | — | Sa11 | — | ... | Sa1α |
| Service B | Sb21 | Sb22 | — | ... | Sb2α | Sa21 | — | ... | Sa2α |
| ... | ... | ... | ... | ... | ... | ... | ... | ... | ... |
| Service M | — | Sbm2 | Sbm3 | ... | — | — | Sam2 | ... | Samα |

Fig.17

| State number (Node ID) | | Sensor value | | | | | |
|---|---|---|---|---|---|---|---|
| | | Sensor value 1 | Sensor value 2 | Sensor value 3 | Sensor value 4 | ... | Sensor value β |
| Start state | S1 | 0 | 0 | 0 | 0 | ... | 0 |
| Passage route node | S2 | 1 | 0 | 0 | 0 | ... | 0 |
| Present state | S4 | 1 | 1 | 0 | 0 | ... | 0 |
| Predicted route node | S7 | 1 | 0 | 0 | 0 | ... | 0 |
| Predicted route node | S8 | 1 | 1 | 1 | 0 | ... | 1 |
| Predicted state | S9 | 1 | 1 | 0 | 0 | ... | 0 |

Undergone a change → Power source ON

Undergone no change → Power source OFF

Fig.19

| Vehicle type (501) | State number (Node ID) (502) | Group of vehicle signals (503) | | | | | Count value (504) |
|---|---|---|---|---|---|---|---|
| | | Vehicle signal 1 | Vehicle signal 2 | Vehicle signal 3 | ... | Vehicle signal α | |
| Vehicle type A | S1a | A11a | A12a | A13a | ... | A1αa | NS1a |
| | S2a | A21a | A22a | A23a | ... | A2αa | NS2a |
| | ... | ... | ... | ... | ... | ... | ... |
| | Sma | Am1a | Am2a | Am3a | ... | Amαa | NSma |
| Vehicle type B | S1b | A11b | A12b | A13b | ... | A1αb | NS1b |
| | S2b | A21b | A22b | A23b | ... | A2αb | NS2b |
| | ... | ... | ... | ... | ... | ... | ... |
| | Smb | Am1b | Am2b | Am3b | ... | Amαb | NSmb |
| Vehicle type C | S1c | A11c | A12c | A13c | ... | A1αc | NS1c |
| | ... | ... | ... | ... | ... | ... | ... |

| Vehicle type 505 | Link ID 506 | Start terminal node ID 507 | End terminal node ID 508 | Count value 509 T2A |
|---|---|---|---|---|
| Vehicle type A | L11a | 1a | 1a | NL11a |
| | ... | ... | ... | ... |
| | Lmna | ma | na | NLmna |
| Vehicle type B | L11b | 1b | 1b | NL11b |
| | ... | ... | ... | ... |
| | Lmnb | mb | nb | NLmnb |
| Vehicle type C | L11c | 1c | 1c | NL11c |
| | ... | ... | ... | ... |

VEHICLE STATE PREDICTION SYSTEM

CROSS REFERENCE TO RELATED APPLICATION

This application claims priority from Japanese Patent Application No. 2015-018809, filed on Feb. 2, 2015, the disclosure of which is incorporated herein by reference in its entirety.

BACKGROUND

1. Field

Apparatuses, systems and methods consistent with exemplary embodiments relate to vehicle state prediction systems that predict a future state of a vehicle.

2. Description of Related Art

A system disclosed by Japanese Laid-Open Patent Publication No. 2003-252130 ("JP '130") relates to a vehicle state prediction system. A management selection table included in the vehicle state prediction system includes combinations of a predetermined vehicle situation and a command from a driver or a notice from an in-vehicle device as conditions, and, also includes how the driver copes with each situation when a command or a notice is received and correlated with each condition. This vehicle state prediction system identifies a condition corresponding to the time when a command or a notice is received in the present vehicle situation, predicts the driver's management from the identified condition, and presents its result to the driver.

However, in the system disclosed by JP '130, if vehicle situations with which the driver can cope, commands from the driver, and notices from the in-vehicle devices are all recorded, the number of those combinations will become very large, and, consequently, the volume of data of the management selection table will become very large.

On the other hand, if vehicle situations with which the driver can cope, commands from the driver, and notices from the in-vehicle devices are limited in order to restrain the volume of data of the management selection table, the prediction accuracy of the management of the driver based on the management selection table will fall as a matter of course. In other words, in the vehicle state prediction system of JP '130, the volume of data of the management selection table has a trade-off relationship with respect to the prediction accuracy of the management of the driver, and it is difficult to ensure satisfactory performances of the data.

An objective of the present disclosure is to provide a vehicle state prediction system that is capable of predicting a future vehicle state with high reliability while restraining the volume of data.

SUMMARY

According to an aspect of an exemplary embodiment, a vehicle state prediction system is provided that includes encoding circuitry, network generating circuitry, and state predicting circuitry.

The encoding circuitry may be configured to encode a vehicle state by use of time-series information of one or more vehicle signals. The network generating circuitry may be configured to define symbols representing the encoded vehicle state as nodes in order of appearance.

The network generating circuitry may define transitions between nodes as links and generate a network structure by accumulating the number of appearances of the nodes and the number of passages of the links.

The state predicting circuitry may be configured to predict a route showing a future change in the vehicle state from among a plurality of routes from a first node to a second node. The route may describe the path and transitions from a first vehicle state to a last vehicle state along with the intervening vehicle states. The first node corresponds to the current vehicle state. The second node corresponds to the vehicle state after having transitioned a predetermined number of times from the first node.

The state predicting circuitry may be configured to predict, as the route showing a future change in the vehicle state, a route in which at least one of an accumulated value of the node that exists in the routes and an accumulated value of the link that exists in the routes is greatest, from among the plurality of routes.

According to an aspect of an exemplary embodiment, a vehicle state is encoded by use of time-series information of one or more vehicle signals, and symbols acquired by encoding are defined as nodes in order of appearance. Transitions between the nodes are defined as links, and a network structure is generated by accumulating the number of appearances of the nodes and the number of passages of the links. In other words, even if vehicle signals to determine a vehicle state may vary in kind, a group of those vehicle signals is consolidated into one symbol by encoding. Moreover, encoding makes it possible to avoid recording the same vehicle state redundantly, and counting is performed such that only the number of appearances or only the number of passages is accumulated. Therefore, even if vehicle signals to determine a vehicle state vary, the volume of data of nodes in the network structure is prevented from becoming too large.

Additionally, unlike a case in which a network structure is treated as a transition probability model, there is no need to re-calculate the existing information besides nodes or links to be targeted when the number of appearances of nodes or the number of passages of links is accumulated. Therefore, the calculation load is reduced when the network structure is updated.

Additionally, it is estimated that a route on a network that includes nodes having a greatest number of appearances or links having a greatest number of passages at a point in the past at which the network structure was generated will show a change in the vehicle state having a high appearance frequency in the future. Therefore, a route in which the accumulated value of at least one of the number of appearances of nodes and the number of passages of links is greatest is calculated, and this calculation makes it possible to predict a vehicle state corresponding to a node that exists in this route so as to acquire high reliability as a future vehicle state while restraining the volume of data.

According to an aspect of an exemplary embodiment, the state predicting circuitry may be configured to predict, as the route showing a future change in the vehicle state, a route that is greatest in the number of passages of the links existing in the plurality of routes from the first node to the second node.

According to an aspect of an exemplary embodiment, an algorithm, such as Dijkstra's algorithm that is a kind of solution for an optimization problem, i.e., so-called shortest route problem, in which a route having the minimum weight is found from among routes each of which connects two nodes to each other in a network, is applied to, for example, a value acquired by subtracting the number of passages of links from a predetermined reference value. As a result, it is possible to swiftly calculate a route showing a future change of the vehicle state.

According to an aspect of an exemplary embodiment, existing nodes form the network structure. When the vehicle state does not transition to a vehicle state corresponding to the existing nodes even if a certain period of time elapses from a point in time at which the vehicle state does not correspond to any of the existing nodes, the state predicting circuitry may be configured to predict the route showing a future change in the vehicle state while setting, as a starting point, a node corresponding to a vehicle state that has a least difference from that of a present point in time among the existing nodes.

The existing nodes forming a network structure may show a history of a vehicle state that has changed until the present point in time. Therefore, the fact that the vehicle state does not correspond to any of the existing nodes indicates that the vehicle state is a new vehicle state at the present point in time. If the vehicle state does not change to a vehicle state corresponding to an existing node even if a certain period of time has elapsed from this point in time, a situation in which an inexperienced vehicle operation is being presumably performed will occur. In this situation, a future vehicle state is particularly required to be predicted, for example, in order to the guide of a vehicle operation by means of voice interaction. In this respect, according to the aforementioned configuration, when the vehicle is placed in that situation, it is possible to swiftly predict a future vehicle state by setting a node corresponding to a vehicle state having a least difference from the present vehicle state as a starting point even if the present vehicle state is a vehicle state that does not correspond to any of the existing nodes.

According to an aspect of an exemplary embodiment of the vehicle state prediction system, the system further includes a plurality of audio databases, in which voice pattern groups that differ from each other are stored and a voice processing circuitry, which enables a transition of a vehicle state through a voice recognition process. The voice processing circuitry may be configured to perform the voice recognition process by collating an input voice with an audio database selected from among the audio databases and perform switching from the audio database to another audio database suitable for a vehicle state included in a route predicted by the state predicting circuitry.

According to an aspect of an exemplary embodiment, switching is performed in advance to an audio database suitable for a voice recognition process while predicting a voice recognition process performed in a future vehicle state. This makes it possible to improve the recognition accuracy of the voice recognition process.

According to an aspect of an exemplary embodiment of the vehicle state prediction system, under the condition that a route predicted by the state predicting circuitry includes a node corresponding to a vehicle state that has undergone a transition through the voice recognition process, the voice processing circuitry may be configured to switch the audio database.

The aforementioned configuration increases the possibility that the audio database after switching will be actually used in the predicted future vehicle state. Therefore, it is possible to improve voice recognition accuracy by switching between audio databases with high reliability.

According to an aspect of an exemplary embodiment of the vehicle state prediction system, the state predicting circuitry may be configured to predict the route showing a future change in the vehicle state by defining, as the second node, a node corresponding to a vehicle state that underwent a transition through the voice recognition process in the past. The voice processing circuitry may be configured to perform switching from the audio database to an audio database that was used for the transition to the second node in the route predicted by the state predicting circuitry.

According to an aspect of an exemplary embodiment, switching to an audio database suitable for the voice recognition process is adapted to the actual circumstances. This further improves the recognition accuracy of the voice recognition process.

According to an aspect of an exemplary embodiment of the vehicle state prediction system, when there are a plurality of nodes each of which corresponds to a vehicle state that has undergone a transition through the voice recognition process, the state predicting circuitry may be configured to set and give the plurality of nodes a priority higher in proportion to a decrease in node-to-node distance. The audio database is used for a transition to the node. The voice processing circuitry may be configured to perform switching among audio databases used for the voice recognition process sequentially from the audio database that has been used for the transition to the node having a high priority given by the state predicting circuitry.

According to the aforementioned configuration, even if there is a plurality of nodes each of which corresponds to a vehicle state that has changed through a voice recognition process, it is possible to perform switching to an audio database suitable for those voice recognition processes, and therefore it is possible to improve general-purpose properties.

According to an aspect of an exemplary embodiment of the vehicle state prediction system, the vehicle signal is different between the first node and the second node. The voice processing circuitry may be configured to perform switching between the audio databases under the condition that the vehicle signal is operable through the voice recognition process.

According to an aspect of an exemplary embodiment, the recognition accuracy of a voice recognition process is improved by switching to an audio database suitable for the voice recognition process of the actual circumstances.

According to an aspect of an exemplary embodiment of the vehicle state prediction system, the system further includes service executing circuitry, which is capable of executing one or more services accompanied by a transition of the vehicle state. The service executing circuitry may be configured to execute the services when a node included in the route predicted by the state predicting circuitry satisfies a predetermined service start-up condition.

According to an aspect of an exemplary embodiment, while predicting a service that is executed in a future vehicle state, the predicted service is performed without performing any vehicle operation. This makes it possible to provide a service conforming to the future vehicle state with convenience.

According to an aspect of an exemplary embodiment of the vehicle state prediction system, the service executing circuitry may be configured to determine the service start-up condition under the condition that an end terminal node in the route predicted by the state predicting circuitry coincides with a vehicle state for which a predetermined service has been executed.

According to an aspect of an exemplary embodiment, a targeted service is narrowed prior to the determination process of the service start-up condition, and therefore it is possible to reduce the processing load in predicting a service that is executed in a future vehicle state.

According to an aspect of an exemplary embodiment of the vehicle state prediction system, the vehicle signal determines the vehicle state for which a service has been executed. When an end terminal node in the route predicted by the state predicting circuitry coincides with the vehicle state for which a service has been executed in each of the plurality of services, the service executing circuitry may be configured to determine the service start-up condition sequentially from a service that is greatest in number of the vehicle signals that determine the vehicle state for which a service has been executed.

According to an aspect of an exemplary embodiment, even if there is a plurality of candidates of a service that is executed in a future vehicle state, it is possible to successively determine a start-up condition with respect to the service candidates, and therefore it is possible to improve general-purpose properties and convenience.

According to an aspect of an exemplary embodiment of the vehicle state prediction system, the system further includes power managing circuitry, which manages a power source of a sensor that detects a vehicle signal. An output value of a vehicle signal is acquired from each of the nodes. When the output value of the vehicle signal does not change between the nodes in the route predicted by the state predicting circuitry, the power managing circuitry may be configured to set the power source of the sensor that detects the vehicle signal to OFF.

According to an aspect of an exemplary embodiment, if there is a vehicle signal that is predicted not to have a change in the output value in the future, the operation of the sensor that detects a vehicle signal supposedly becomes needless. Therefore, it is possible to reduce power consumption of the whole system by setting in advance the power source of this sensor to OFF.

According to an aspect of an exemplary embodiment of the vehicle state prediction system, a second route leads from a node corresponding to a past vehicle state to a node corresponding to the current vehicle state. The power managing circuitry may be configured to set the power source of the sensor to OFF further under the condition that the output value of the vehicle signal does not change between nodes in the second route.

According to an aspect of an exemplary embodiment, the fact that the output value of the sensor has not been changed during a period from the past vehicle state to the current vehicle state is added to the conditions for pre-setting the power source of the sensor to OFF. Therefore, it is possible to reduce power consumption of the whole system while selecting vehicle signals that are excluded from among to-be-detected vehicle signals even more discreetly.

According to an aspect of an exemplary embodiment of the vehicle state prediction system, the system further includes power managing circuitry, which manages a power source of a sensor that detects a vehicle signal. An output value of a vehicle signal is acquired from each of the nodes. When a node in the route predicted by the state predicting circuitry includes a vehicle signal showing an output value different from that of the current vehicle state, the power managing circuitry may be configured to set the power source of the sensor that detects the vehicle signal to ON.

According to an aspect of an exemplary embodiment, it is possible to accurately perform the detection operation by starting in advance the operation of the sensor that detects a vehicle signal when there is a vehicle signal predicted to have a change in the output value.

According to an aspect of an exemplary embodiment of the vehicle state prediction system, the system may further include a management center, which manages traveling information of a plurality of targeted vehicles through wireless communication. The network generating circuitry may be located in the management center. The network generating circuitry may be configured to generate the network structure by defining vehicle states based on the current vehicle signals received from a plurality of vehicles as nodes. The network generating circuitry may be configured to add the accumulated values of the nodes in the plurality of vehicles to the accumulated values of the links in the network structure. The state predicting circuitry may be located in the management center. The state predicting circuitry may be configured to predict a route showing a future change in the vehicle state based on the network structure. The state predicting circuitry may be configured to deliver the route predicted by the state predicting circuitry to each vehicle.

According to an aspect of an exemplary embodiment, the network structure is generated in a manner that histories of changes in the vehicle states in the vehicles are shared. Therefore, there is also a case in which, even if a vehicle state is a new one in a vehicle, the vehicle state is an existing one in another vehicle, and it becomes easier to widen the range of the network structure than in a case in which the network structure is generated for each vehicle. Therefore, it is possible to improve general-purpose properties and practicality when a future vehicle state is predicted on the basis of the network structure.

Other aspects and advantages will become apparent from the following description, taken in conjunction with the accompanying drawings, illustrating by way of example the principles of the exemplary embodiments.

BRIEF DESCRIPTION OF THE DRAWINGS

The features of the exemplary embodiments are set forth with particularity in the appended claims. The exemplary embodiments, together with objects and advantages thereof, may best be understood by reference to the following description of the exemplary embodiments together with the accompanying drawings in which:

FIG. 4 is a schematic diagram showing data contents stored by a node data table of the first exemplary embodiment;

FIG. 5 is a schematic diagram showing data contents stored by a link data table of the first exemplary embodiment;

FIG. 8 is a schematic diagram showing data contents stored by a link data table in a vehicle state prediction system of a second exemplary embodiment;

FIG. 11 is a schematic diagram showing data contents stored by a service condition table of the third exemplary embodiment;

FIG. 17 is a schematic diagram showing one example of changes in sensor values of various sensors from a start state to a predicted state;

FIG. 19 is a schematic diagram showing data contents stored by a node data table of the fifth exemplary embodiment;

FIG. 20 is a schematic diagram showing data contents stored by a link data table of the fifth exemplary embodiment.

DESCRIPTION OF THE EXEMPLARY EMBODIMENTS

First Exemplary Embodiment

A vehicle state prediction system according to a first exemplary embodiment will now be described with reference to FIGS. 1 to 7.

The vehicle state prediction system of the first exemplary embodiment may be configured by an agent electronic controller (ECU), which provides various pieces of information to vehicle occupants of a vehicle. The agent ECU has a voice interaction function. Based on the contents of recognition of voices input from a vehicle occupant of the vehicle, the agent ECU controls the operation of in-vehicle devices and performs a voice utterance or outputs an audible sound according to the contents of recognition. The agent ECU stores the past history of vehicle states as a network structure by use of time-series information of vehicle signals. The agent ECU is configured to improve the accuracy of voice recognition by predicting future changes in the vehicle state by use of this stored network structure and by allowing a voice recognition dictionary (audio database) suitable for the vehicle state to be on standby in advance.

Figure 1:
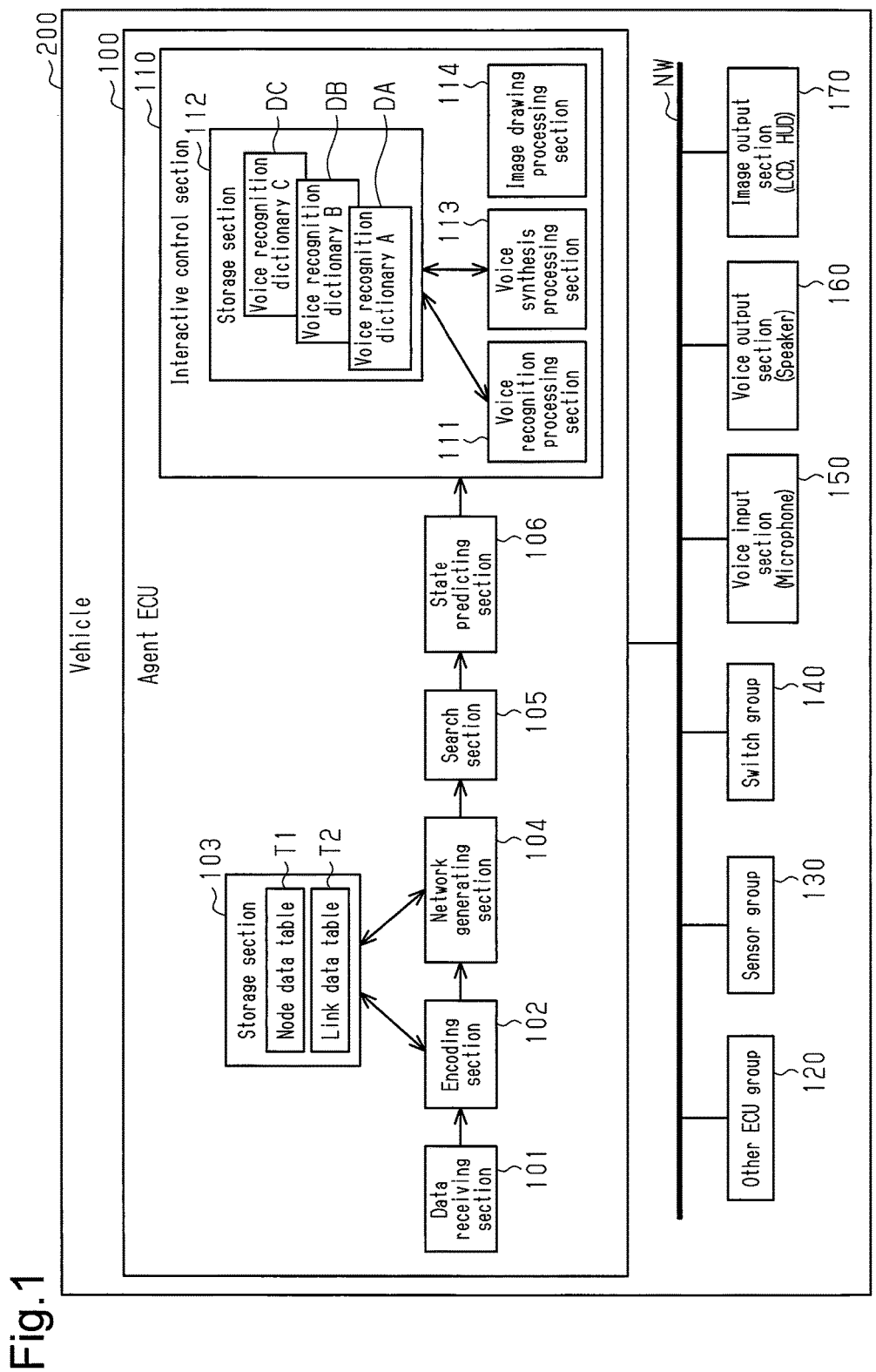
FIG. 1 is a block diagram showing a schematic configuration of a first exemplary embodiment of a vehicle state prediction system.

More specifically, as shown in FIG. 1, the agent ECU 100 is connected to another ECU group 120, a sensor group 130, and a switch group 140 through a vehicle network NW, such as a CAN (Controller Area Network). The agent ECU 100 may comprise various electric circuits.

The other ECU group 120 are in-vehicle ECUs that control the operation of various in-vehicle devices, and includes an in-vehicle ECU that controls various pieces of vehicle-drive-system in-vehicle devices, such as an engine, a brake, and a steering device, an in-vehicle ECU that controls pieces of body-system in-vehicle devices, such as meters, that display various states of an air conditioner and of a vehicle 200, and an in-vehicle ECU that controls pieces of information-system in-vehicle devices including a car navigation system, for example, to guide a route from a present place to a destination place.

The sensor group 130 is a group of sensors to detect various vehicle states, and includes one or more of sensors (A) to (R) listed below:
 (A) GPS sensor (latitude/longitude, altitude, time);
 (B) Laser, infrared rays, ultrasonic sensor (distance between forward and rearward vehicles, distance to an obstacle);
 (C) Raindrop sensor;
 (D) Outside air temperature sensor;
 (E) Vehicle interior temperature sensor;
 (F) Seating sensor;
 (G) Seatbelt wearing state sensor;
 (H) SmartKey (registered trademark) sensor (key position information);
 (I) Intrusion monitoring sensor;
 (J) Visible light/infrared light image sensor (camera image);
 (K) Pollen-like particulate sensor;
 (L) Acceleration sensor (vehicle behavior such as inclination);
 (M) Illuminance sensor;
 (N) Electric field strength sensor (electric field strength of a given frequency band);
 (O) Driver monitor (face direction, line of sight);
 (P) Vehicle speed sensor;
 (Q) Steering angle sensor; and
 (R) Yaw rate sensor.

The switch group 140 is a group of switches to switch the operation of various in-vehicle devices, and includes one or more of switches (a) to (n) listed below:
 (a) Direction indicator lever switch;
 (b) Wiper operation switch;
 (c) Light operation switch;
 (d) Steering switch;
 (e) Navigation/audio operation switch;
 (f) Window operation switch;
 (g) Door/trunk open-close/lock switch;
 (h) Air conditioner operation switch;
 (i) Seat heater/ventilation switch;
 (j) Seat position adjustment/preset memory switch;
 (k) Intrusion monitoring system switch;
 (l) Mirror operation switch;
 (m) Adaptive cruise control (ACC) switch; and
 (n) Engine switch.

Through the data receiving section 101, the agent ECU 100 acquires vehicle signals input from these groups, i.e., from the other ECU group 120, the sensor group 130, and the switch group 140 through the vehicle network NW, and the agent ECU 100 allows those acquired vehicle signals to be input into an encoding section 102. The encoding section 102 encodes a vehicle state by use of the acquired vehicle signals, and allows information of symbols acquired to be encoded and stored in a storage section 103. The encoding section 102 and the storage section 103 may comprise of various electric circuits.

Figure 2:
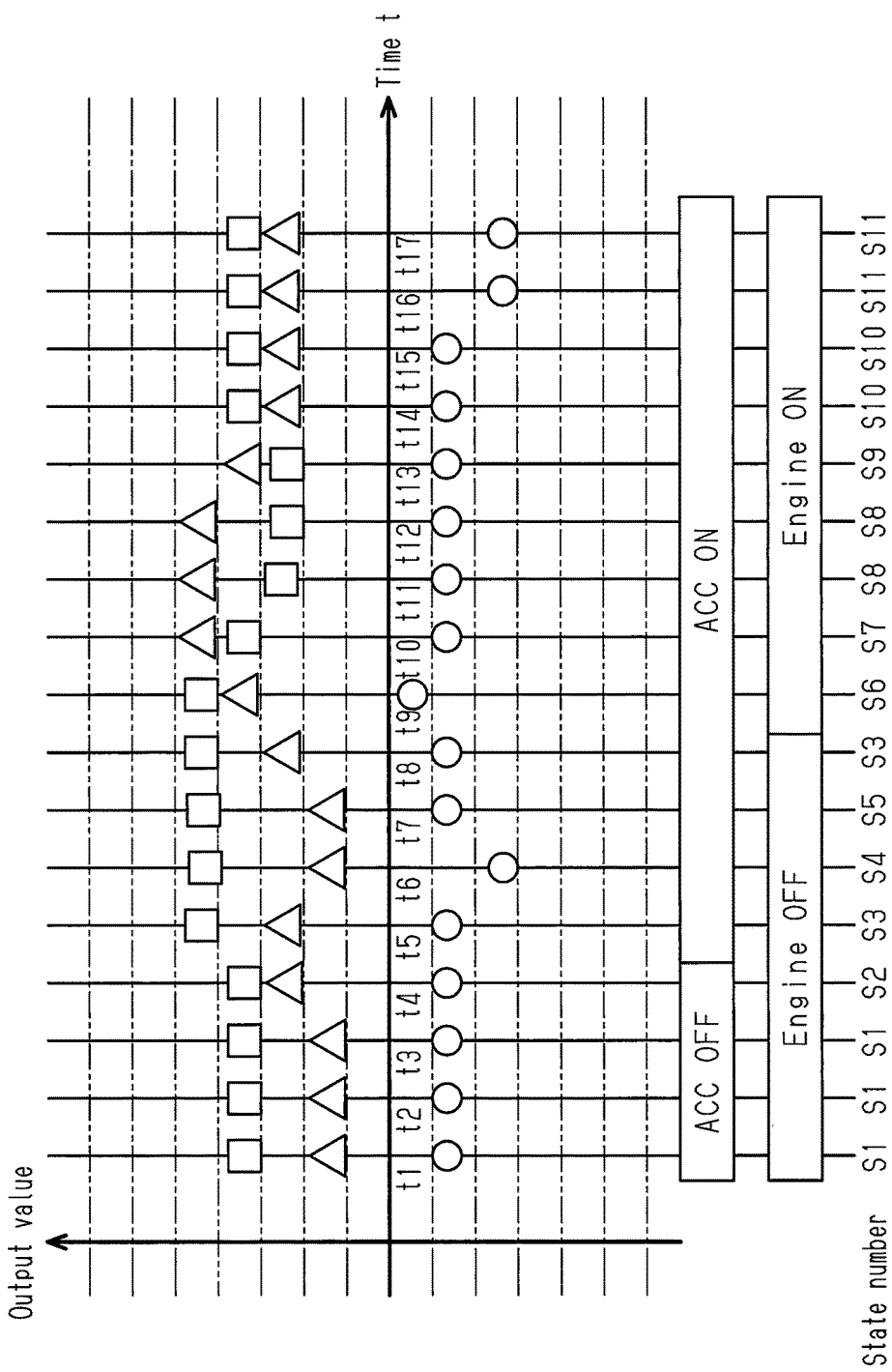
FIG. 2 is a schematic diagram showing one example of an encoding mode based on time-series information of vehicle signals.

FIG. 2 shows one example of an encoding mode based on time-series information of vehicle signals. In this drawing, each ECU signal value acquired as a vehicle signal from the other ECU group 120 at constant time intervals is represented as symbol "○," and sensor values acquired from the sensor group 130 at the same time are represented as symbol "Δ" and symbol "□," respectively, and switch signals acquired as vehicle signals from the switch group 140 at the same time are represented as bar displays, respectively (in FIG. 2, an ACC switch signal and an engine switch signal are shown as one example). A state number is given for each combination of these ECU signal values, sensor values, and switch signals with as time elapses. In the example shown in FIG. 2, no one of the ECU signal value, the sensor value, and the switch signal is changed between time t1 and time t3, and therefore the same state number "S1" is given at each of time t1 to time t3. On the other hand, the sensor value "Δ" is changed at time t4 although the ECU signal value "○," the sensor value "□," and the switch signals of both the ACC switch and the engine switch are not changed at time t4, and therefore a new state number "S2" is given at time t4. The sensor value "□" and the switch signal of the ACC switch are changed at time t5 although the ECU signal value "○," the sensor value "Δ," and the switch signal of the engine switch are not changed at time t5, and therefore a new state number "S3" is given at time t5. At time t8, all of the ECU signal value, the sensor value, and the switch signal coincide with those of time t5 in comparison with time t5. However, the sensor value "Δ" at time t5 is changed in comparison with time t7. Therefore, the state number "S3" existing at time t5 is given at time t8.

In other words, a configuration is formed so that, if any one of the ECU signal value to be acquired from the other ECU group 120 as a vehicle signal, the sensor value to be acquired from the sensor group 130 as a vehicle signal, and the switch signal to be acquired from the switch group 140 as a vehicle signal differs from the ECU signal value, the sensor value, and the switch signal that have been acquired by the present time, a new state number is given to the values to be acquired. On the other hand, a configuration is formed so that, if all of the ECU signal value to be acquired from the other ECU group 120 as a vehicle signal, the sensor value to be acquired from the sensor group 130 as a vehicle signal, and the switch signal to be acquired from the switch group 140 as a vehicle signal coincide with the ECU signal value, the sensor value, and the switch signal that have been acquired by the present time, an existing state number is given to the values to be acquired.

Figure 3:
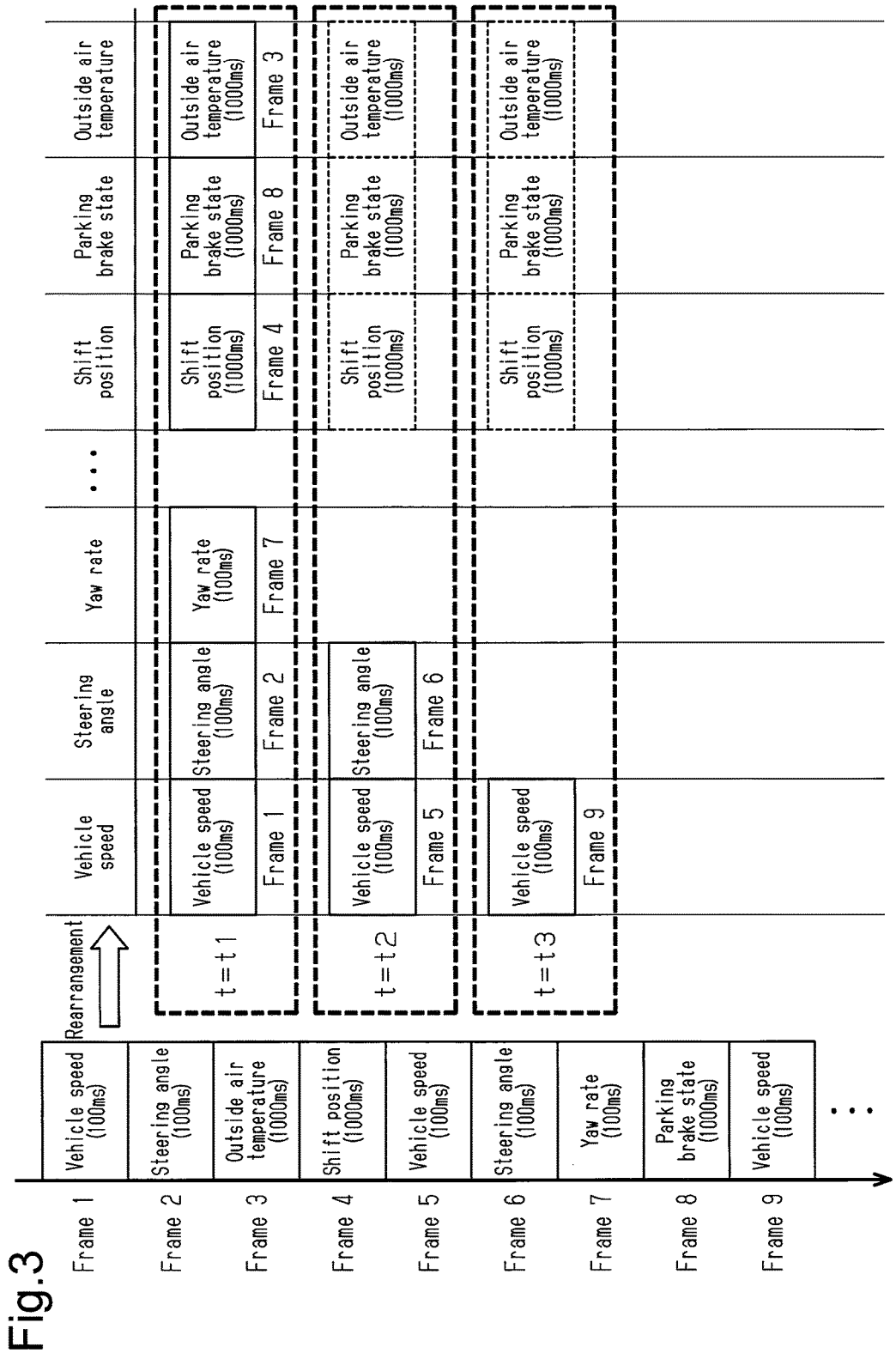
FIG. 3 is a schematic diagram showing one example of a data structure when a combination of vehicle signals at each point in time is acquired.

FIG. 3 shows one example of a data structure when a combination of vehicle signals at each point in time are acquired. In this drawing, the "vehicle speed," the "steering angle," the "yaw rate," and the "outside air temperature" each of which is a sensor value to be acquired are illustrated, and the "shift position" and the "parking brake state" each of which is a switch signal to be acquired are illustrated. These acquisition intervals are different from each other in each vehicle signal, and, in the example shown in this drawing, the acquisition interval of each vehicle signal of the "vehicle speed," the "steering angle," and the "yaw rate" is comparatively short (for example, 100 ms), and the acquisition interval of each vehicle signal of the "shift position," the "parking brake state," and the "outside air temperature" is comparatively long (for example, 1000 ms).

The acquisition order of these vehicle signals is not always constant, and is sometimes changed depending on each output timing at which vehicle signals are output from the other ECU group 120, from the sensor group 130, and from the switch group 140. In the example shown in this drawing, "Transmission frame 1" to "Transmission frame 8" are arranged in the order in which the agent ECU receives transmission frames through the vehicle network, and one vehicle signal is included in each of these transmission frames. In this example, the group of the vehicle signals ("vehicle speed," "steering angle," and "yaw rate") each of which is comparatively short in the acquisition interval differ from each other in the transmission frequency, and the high-to-low order in which the vehicle signals become lower in transmission frequency is the "vehicle speed," the "steering angle," and the "yaw rate." Therefore, in this example, if vehicle signals acquired in order from the earliest timing to latest timing, all of the "vehicle speed," the "steering angle," and the "yaw rate" are obtained at time t1, the "yaw rate" is not obtained at time t2, and the "steering angle" and the "yaw rate" are not obtained at time t3. Therefore, if the vehicle signal transmitted thereafter is the "vehicle speed," this "vehicle speed" is employed as a vehicle signal at time t4. On the other hand, if the vehicle signal transmitted thereafter is the "steering angle," this "steering angle" is employed as a vehicle signal at time t3. If the vehicle signal transmitted thereafter is the "yaw rate," this "yaw rate" is employed as a vehicle signal at time t2. In other words, with respect to a group of vehicle signals each of which has a comparatively short acquisition interval, if all the vehicle signals are not obtained at a certain point in time, a corresponding vehicle signal is employed as a vehicle signal at the certain point in time when the corresponding vehicle signal is acquired. Therefore, even if the output timing of vehicle signals changes as described above, the vehicle signals at each point in time will reliably all be obtained.

In this example, concerning the group (the "shift position," the "parking brake state," and the "outside air temperature") of vehicle signals each of which has a comparatively long acquisition interval, if vehicle signals are employed in order from the earliest obtained signal to the latest obtained signal, all of the "shift position," the "parking brake state," and the "outside air temperature" are obtained at time t1, and not all of the vehicle signals are obtained at time t2 or time t3 because the acquisition interval is comparatively long. The "shift position," the "parking brake state," and the "outside air temperature" at time t1 are employed as vehicle signals at time t2 and time t3. In other words, concerning the group of vehicle signals each of which has a comparatively long acquisition interval, if not all of the vehicle signals are obtained at a certain point in time, vehicle signals acquired most recently are employed as vehicle signals at this certain point in time. Therefore, even if vehicle signals that have mutually different acquisition intervals are to be acquired, these vehicle signals at each point in time will reliably be obtained while restraining a time lag. It is thus possible to encode a vehicle state corresponding to each point in time by use of these vehicle signals.

As shown in FIG. 1, the agent ECU 100 includes a network generating section 104, which generates a network structure in which symbols each of which represents an encoded vehicle state are each defined as a node in order of appearance and in which the transitions between those nodes are defined as links. When this network structure is generated, the network generating section 104 rewrites and updates information on the defined node onto a node data table T1 stored in the storage section 103, and rewrites and updates information on the defined link onto a link data table T2 stored in the storage section 103. The network generating section 104 may comprise various electric circuits.

As shown in FIG. 4, state numbers 301 (node ID) of encoded vehicle states, groups 302 of vehicle signals that define those vehicle states, and count values 303 of the number of appearances of a vehicle state (node) are correlated with the node data table T1. In the node data table T1 shown in this drawing, the number of state numbers of encoded vehicle states is added whenever a new state number is given in the encoding section 102. The count values 303 correlated with the state numbers 301 are accumulated whenever a corresponding state number is given as an existing state number in the encoding section 102.

On the other hand, as shown in FIG. 5, link IDs 304 corresponding to the transition between encoded vehicle states, start terminal node IDs 305 that represent state numbers of vehicle states that have not yet undergone a transition, end terminal node IDs 306 that represent state numbers of vehicle states that have undergone a transition, and count values 307 of the number of transitions (the number of passages) between vehicle states are correlated with the link data table T2. In the link data table T2 shown in this drawing, the number of link IDs 304 is added whenever the transition to those state numbers is new in spite of the fact that a state number encoded in the encoding section 102 is either a new state number or an existing state number. The count values 307 correlated with these link IDs 304 are added whenever the transition to a state number encoded in the encoding section 102 is an existing one.

As shown in FIG. 1, through a search section 105, the agent ECU 100 searches for an optimal route based on a predetermined algorithm among a plurality of routes from a node corresponding to a present vehicle state to a node corresponding to a vehicle state that has transitioned a predetermined number of times in a generated network structure. The route may describe the path and transitions from a first vehicle state to a last vehicle state along with the intervening vehicle states. Through a state predicting section 106, the agent ECU 100 predicts a vehicle state corresponding to a node that exists in the optimal route searched thereby as a future vehicle state. The search section 105 and the state predicting section 106 may comprise various electric circuits.

A search method for an optimal route based on a predetermined algorithm will be described with reference to FIG. 6. In the network structure shown in FIG. 6, the count value of a node corresponding to a vehicle state is represented as the height of a layered structure of blocks, and the count value of a link corresponding to the transition between vehicle states is represented as the thickness of an arrow. In the network structure shown in this drawing, each block of the layered structure corresponds to a cumulative observation frequency. In the network structure shown in this drawing, only a part of a link corresponding to the transition between vehicle states is shown in a simplified manner for descriptive convenience.

When a search is made for the optimal route, a link corresponding to the transition to a node of state number S4 and a link corresponding to the transition to a node of state number S6 are first extracted as links that extend from a node of state number S2, which corresponds to the present vehicle state. In these extracted links, the link corresponding to the transition to the node of state number S6 is selected as a link having the maximum count value.

Thereafter, it is confirmed whether the fact that the count value of the node of state number S6 to be a transition destination is equal to or more than a predetermined threshold value (e.g., the number of blocks of the layered structure is five or more), which is one example of search end conditions, is satisfied or not. In this case, the count value (2 pieces) of the node of state number S6 is less than the predetermined threshold value, and therefore, as links that extend from this node, a link corresponding to the transition (standby) to the node of state number S6, a link corresponding to the transition to a node of state number S7, and a link corresponding to the transition to a node of state number S9 are extracted. Among these extracted links, the link corresponding to the transition to the node of state number S7 is selected as a link having the maximum count value. Likewise, in this case, the count value (1 piece) of the node of state number S7 to be a transition destination is less than the predetermined threshold value, and therefore links that extend from this node continue to be extracted.

Thereafter, until the count value of a node to be a transition destination becomes equal to or more than a predetermined threshold value, links extending from the node to be a transition destination are repeatedly extracted, and a link having the maximum count value is repeatedly selected from among the extracted links. In the example shown in FIG. 6, when the node of state number S9 is reached, the count value of the node becomes equal to or more than the predetermined threshold value, and therefore a search for a route (state number S2→state number S6→state number S7→state number S8→state number S9) including all nodes selected until reaching this node is made as an optimal route. Among a plurality of routes from a node corresponding to the present vehicle state to a node corresponding to a vehicle state that has transitioned a predetermined number of times (four times in the example of FIG. 6), this optimal route becomes a route that is greatest in the count value of links that exist in those routes. In other words, this optimal route becomes a route including links that are greatest in the count value at the past time point at which a network structure has been generated, and therefore a change of the vehicle state having a high appearance frequency is supposedly shown in the future. Therefore, a vehicle state (state number S2→state number S6→state number S7→state number S8→state number S9) that exists in this optimal route is predicted as future changes in the vehicle state, i.e., changes in each vehicle signal that defines the vehicle state.

As shown in FIG. 1, the agent ECU 100 includes an interactive control section 110 serving as a voice processing section, which controls a voice interaction performed with a vehicle occupant of the vehicle 200. Through a voice recognition processing section 111, the interactive control section 110 recognizes a voice input from the vehicle occupant of the vehicle through a voice input section 150 such as a microphone. This voice recognition process is performed by use of voice recognition dictionaries DA to DC stored in a storage section 112 included in the interactive control section 110. Words, how to arrange those words, etc., are determined in each of the voice recognition dictionaries DA to DC, and are optimized for each vehicle state supposed by those voice recognition dictionaries DA to DC. For example, if a vehicle state is accompanied by the voice operation of an in-vehicle device, the voice recognition dictionaries DA to DC are optimized so as to include many words for use in voice recognition. Based on future changes in the vehicle state acquired by the state predicting section 106, the interactive control section 110 selects a voice recognition dictionary suitable for a vehicle state being in a change process from among the voice recognition dictionaries DA to DC stored in the storage section 112, and brings in advance this voice recognition dictionary into a standby state. The interactive control section 110 may comprise various electric circuits.

The interactive control section 110 generates a synthetic voice in accordance with the contents of a recognized voice through a voice synthesis processing section 113. In this case, if operation commands and the like that are used for the voice operation of a future vehicle state are stored in the voice recognition dictionaries DA to DC brought into a standby state in advance, an operation command stored therein is read out, and is generated as a synthetic voice. The interactive control section 110 outputs a generated synthetic voice to a voice output section 160 such as a speaker. The interactive control section 110 generates an image signal according to an image output request during a voice interaction through an image drawing processing section 114, and outputs a generated image signal to an image output section 170 such as an LCD (liquid crystal display) or an HUD (head-up display).

Next, concerning a vehicle state prediction process executed by the agent ECU 100, a specific processing procedure will be described as an operation example of the first exemplary embodiment. The agent ECU 100 performs a process shown in FIG. 7 under the condition of IG ON, i.e., under the condition that an ignition switch of the vehicle 200 is in an ON state.

Figure 7:
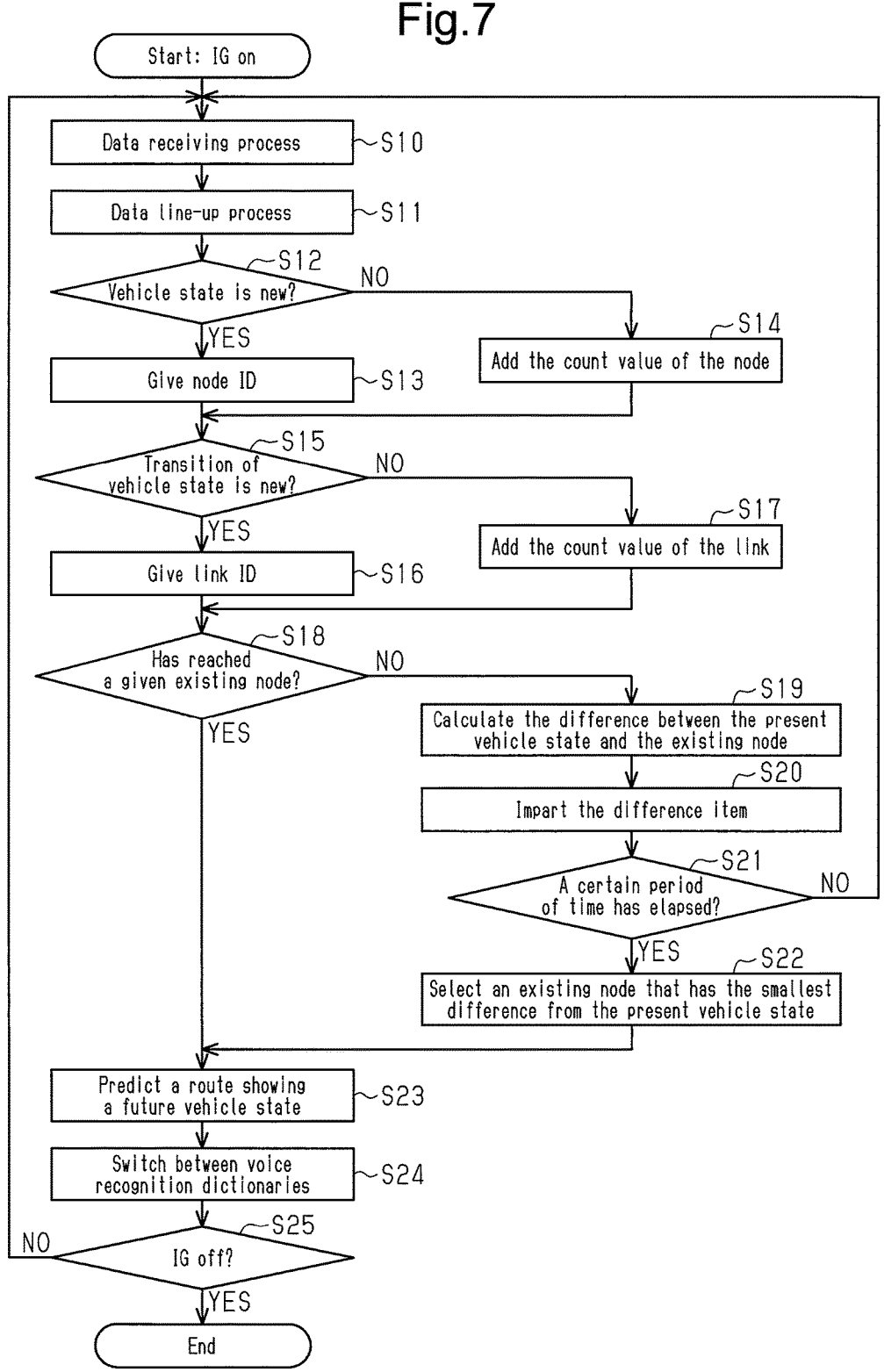
FIG. 7 is a flowchart showing a processing procedure of prediction processing executed by the vehicle state prediction system of the first exemplary embodiment.

As shown in FIG. 7, the agent ECU 100 periodically receives vehicle data to determine a vehicle state (step S10), and constructs a combination of pieces of vehicle data at each point in time by lining up the pieces of vehicle data received thereby in accordance with the procedure of FIG. 3 (step S11). Vehicle states each of which corresponds to each point in time are encoded in order of earliness in time by use of combinations of pieces of vehicle data constructed thereby.

If an encoded vehicle state is new (step S12=YES), a new state number (node ID) is given to the vehicle state (step S13). On the other hand, if an encoded vehicle state is an existing one (step S12=NO), the count value of a node corresponding to the vehicle state is accumulated (step S14).

Thereafter, the agent ECU 100 determines whether the transition of the vehicle state is new (step S15). If the transition of the vehicle state is new (step S15=YES), a new link ID is given to the transition of the vehicle state (step S16). On the other hand, if the transition of the vehicle state is an existing one (step S15=NO), the count value of the link corresponding to the transition of the vehicle state is accumulated (step S17).

Thereafter, the agent ECU 100 determines whether the present vehicle state has reached a given existing node included in a network structure generated at the present point in time, i.e., whether the present vehicle state has transitioned to a given existing node (step S18). If the present vehicle state has reached a given existing node (step S18=YES), the agent ECU 100 predicts a route showing a future vehicle state by use of a generated network structure while setting the present vehicle state as a starting point (step S23).

If the present vehicle state has not reached the given existing node (step S18=NO), the agent ECU 100 calculates the difference between the present vehicle state and the existing node (step S19). For example, if the present vehicle state is a new node corresponding to state number SX as shown by the thin broken line in FIG. 6, the difference between this new node and the existing node is calculated. The difference between these nodes is calculated by evaluating the difference between vehicle signals each of which corresponds to each node with reference to, for example, the node data table T1 of FIG. 4. The difference item of calculated nodes is imparted to the vehicle occupant of the vehicle 200 through the voice output section 160 or through the image output section 170 (step S20). In other words, an existing node forming a network structure shows a history of a vehicle state that has changed until the present point in time, and the fact that the node is in a vehicle state that does not correspond to any one of the existing nodes denotes that a vehicle operation different from an ordinary operation is being performed. Therefore, there is a possibility that the vehicle operation will be an erroneous operation, and there is a need to impart this possibility to the vehicle occupant of the vehicle, and a configuration is formed to perform the aforementioned imparting process.

If a certain period of time has not elapsed after determining that the present vehicle state has not reached the given existing node (step S21=NO), step S10 to step S21 are repeatedly performed until the certain period of time elapses.

On the other hand, if the certain period of time has elapsed after determining that the present vehicle state has not reached the given existing node (step S21=YES), an existing node that has the smallest difference from the present vehicle state is selected (step S22). An existing node nearest to a new node may be selected as the existing node having the smallest difference, or an existing node in which the total result of evaluation values is the smallest may be selected from among all existing nodes. In the example of FIG. 6, an existing node corresponding to state number S7 is selected as the existing node having the smallest difference from the present vehicle state. Thereafter, the agent ECU 100 predicts a route showing a future vehicle state by use of a generated network structure while setting the existing node selected in step S22 as a starting point (step S23). The reason is that, even if the existing node strictly differs from the present vehicle state, it is preferable to swiftly execute a prediction of the future vehicle state by setting this existing node as a starting point in order to, for example, realize the guide of a vehicle operation by means of a voice interaction in a situation in which the vehicle operation different from an ordinary operation is being performed.

Thereafter, the agent ECU 100 selects a voice recognition dictionary suitable for a vehicle state that exists in a route predicted in step S23 from among the voice recognition dictionaries DA to DC stored in the storage section 103, and brings in advance the selected dictionary into a standby state (step S24).

Thereafter, as long as the ignition switch of the vehicle 200 is not changed to an OFF state (step S25=NO), the aforementioned process of from step S10 to step S25 is repeatedly performed. On the other hand, if the ignition switch of the vehicle 200 is turned off (step S25=YES), the prediction process shown in FIG. 7 is ended.

The first exemplary embodiment as described above may have one or more the following advantages.

(1) The device of the first exemplary embodiment is configured to construct a network structure such that a vehicle state is encoded by use of time-series information of a plurality of vehicle signals, and symbols acquired thereby are respectively defined as nodes in order of appearance whereas the transitions between those nodes is defined as links, and the number of appearances of those nodes and the number of passages of the links are accumulated respectively. In other words, even if vehicle signals to determine a vehicle state vary, a group of those vehicle signals is consolidated into one symbol by encoding. In other words, encoding makes it possible to avoid recording the same vehicle state redundantly, and counting is performed such that only the number of appearances or only the number of passages is added. Therefore, even if vehicle signals to determine a vehicle state vary in kind, the volume of data of nodes in a network structure is prevented from becoming very large. Additionally, unlike a case in which a network structure is treated as a transition probability model, there is no need to re-calculate existing information besides a targeted node or a targeted link when the number of appearances of nodes or the number of passages of links is added, and therefore a calculation load is reduced when a network structure is updated. Moreover, it is estimated that a route on a network that includes a node having a great number of appearances or a link having a greatest number of passages at a point in the past at which a network structure is generated will show the change in the vehicle state having a high appearance frequency in the future. Therefore, a route in which the accumulated value of at least one of the number of appearances of nodes and the number of passages of links is greatest is calculated, and this calculation makes it possible to predict a vehicle state corresponding to a node that exists in this route so as to acquire high reliability as a future vehicle state while restraining the volume of data.

(2) A route is predicted by setting one of the existing nodes that corresponds to a vehicle state having a least difference from the present point in time as a starting point if a transition is not made to a vehicle state corresponding to existing nodes and a certain period of time elapses from a point in time at which the vehicle is in a vehicle state that does not correspond to any of the existing nodes that form a network structure. Therefore, even if the vehicle is placed in a situation in which the vehicle is in a vehicle state that does not correspond to any of the existing nodes, it is possible to swiftly predict a future vehicle state by setting a node corresponding to a vehicle state having a least difference from the present point in time as a starting point.

(3) The agent ECU 100 is configured to perform switching to a voice recognition dictionary suitable for the vehicle state included in a route predicted by the state predicting section 106. Therefore, the recognition accuracy of the voice recognition process is improved by switching in advance to the voice recognition dictionary suitable for the voice recognition process while predicting the voice recognition process performed in a future vehicle state.

(4) Even when the utterance of a vehicle occupant of the vehicle 200 in a voice interaction arouses the start of a conversation, a voice recognition process performed in a future vehicle state is predicted at the stage before the vehicle occupant of the vehicle 200 actually utters words. This makes it possible to perform in advance switching to a voice recognition dictionary suitable for the voice recognition process.

Second Exemplary Embodiment

Next, a second exemplary embodiment of the vehicle state prediction system will be described with reference to FIGS. 8 and 9. The second exemplary embodiment differs from the first exemplary embodiment in the mode of predicting a route showing a future vehicle state. Therefore, in the following description, a configuration that differs from that of the first exemplary embodiment is chiefly described, and the configuration that is the same or equivalent to that of the first exemplary embodiment is omitted to avoid a redundant description.

As shown in FIG. 8, in the second exemplary embodiment, attribute information 308 that shows whether the transition of the vehicle state has been brought about by a voice recognition operation is also correlated with a link data table T2*a* stored in the storage section 103 (FIG. 1) in addition to a link ID 304 corresponding to the transition between encoded vehicle states, a start terminal node ID 305, which shows the state number of a vehicle state that has not yet transitioned, an end terminal node ID 306, which shows the state number of a vehicle state that has transitioned, and a count value 307 of the number of transitions (the number of passages) between vehicle states. When a search is made for an optimal route, a node corresponding to a vehicle state that served as a transition destination in the past by means of a voice recognition operation is first extracted from among nodes forming a network structure based on the end terminal node ID 306 and based on the attribute information 308 of the link data table T2*a*.

Figure 6:
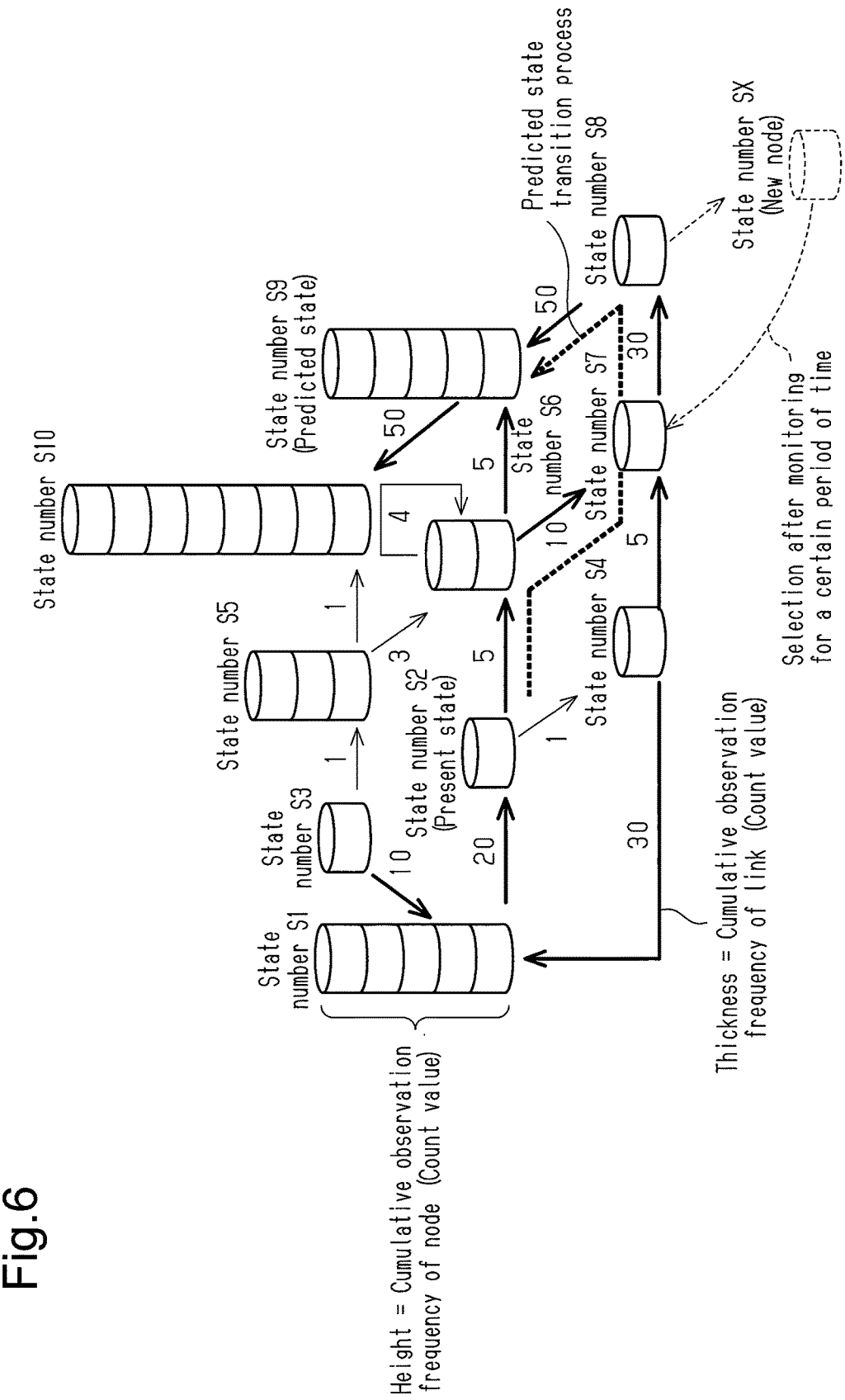
FIG. 6 is a schematic diagram showing one example of a network structure generated by the vehicle state prediction system of the first exemplary embodiment.
Figure 9:
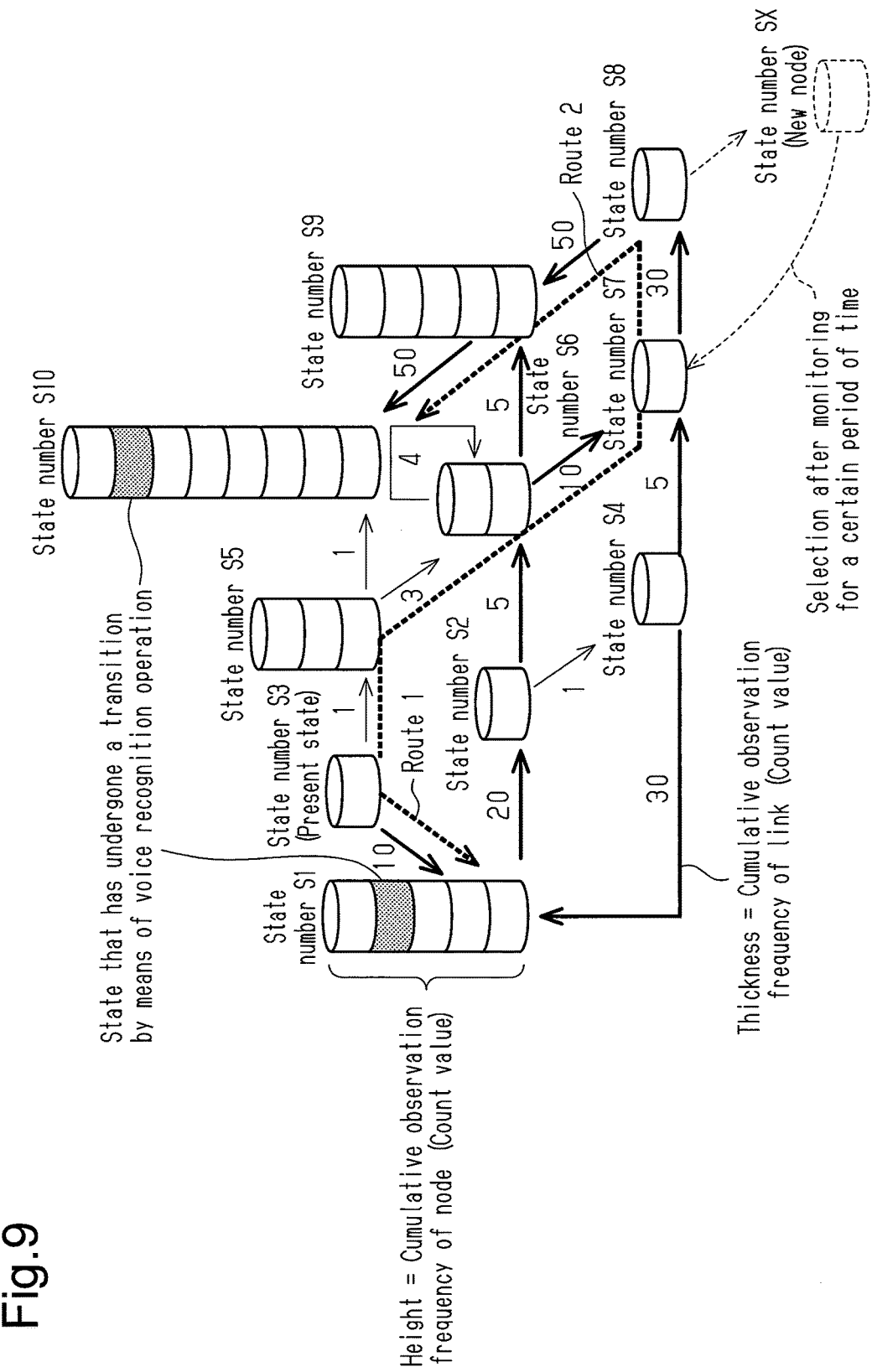
FIG. 9 is a schematic diagram showing one example of a network structure generated by the vehicle state prediction system of the second exemplary embodiment.

In a network structure of FIG. 9 which corresponds to FIG. 6, for example, a block of a layered structure corresponding to a vehicle state that has transitioned by a voice recognition operation is displayed by hatching with dots, and a node of state number S1 and a node of state number S10 are each extracted as a vehicle state that has served as a transition destination by a voice recognition operation. The node of state number S1 and the node of state number S10 extracted above are each defined as an end terminal node of the optimal route.

Thereafter, a link corresponding to the transition to a node of state number S1 and a link corresponding to the transition to a node of state number S5 are each extracted as a link that extends from a node of state number S3 corresponding to the present vehicle state. From among these links extracted above, the link corresponding to the transition to the node of state number S1 is selected as a link having the maximum count value.

Thereafter, it is confirmed whether the node of state number S1 to be a transition destination corresponds to the end terminal node defined previously. In this case, the node of state number S1 corresponds to the end terminal node defined previously, and therefore a route (state number S3→state number S1) including all nodes selected until reaching this node corresponding thereto is regarded as an optimal route ("route 1"), and a search is made for this route. Among a plurality of routes from a node corresponding to the present vehicle state to a node corresponding to a vehicle state that has transitioned a predetermined number of times (one time in the example of FIG. 9), this optimal route ("route 1") becomes a route having a greatest count value of links that exist in those routes.

Thereafter, from among the links extending from the node corresponding to the present vehicle state, a link corresponding to the transition to the node of state number S5 is extracted as a link not included in "route 1" searched previously. If a plurality of links is extracted, a link having the maximum count value is selected from among those extracted links although the number of links extracted therefrom is only one herein.

Thereafter, it is confirmed whether the node of state number S5 corresponding to a vehicle state to be a transition destination corresponds to the end terminal node defined previously. In this case, the node of state number S5 does not correspond to the end terminal node defined previously, and therefore a link corresponding to the transition to the node of state number S6 and a link corresponding to the transition to the node of state number S10 are each extracted as a link extending from that node. A link corresponding to the transition to the node of state number S6 is selected as a link having the maximum count value among those extracted links. Likewise, in this case, the node of state number S6 to be a transition destination does not correspond to the end terminal node defined previously, and therefore links extending from this node continue to be extracted.

Thereafter, until the node to be a transition destination corresponds to the end terminal node defined previously, links that extend from the node to be a transition destination are repeatedly extracted, and the link having the maximum count value is repeatedly selected from among the extracted links. In the example of FIG. 9, it corresponds to the end terminal node defined previously when it reaches the node of state number S10), and therefore a route (state number S3→state number S5→state number S6→state number S7→state number S8→state number S9→state number S10) including all nodes selected until reaching this node corresponding thereto is regarded as an optimal route ("route 2"), and a search is made for this route. Among a plurality of routes from a node corresponding to the present vehicle state to a node corresponding to a vehicle state that has transitioned a predetermined number of times (six times in the example of FIG. 9), this optimal route becomes a route having a greatest count value of links that exist in those routes.

A high priority ("route 1">"route 2") is set in order of shortness in distance of the optimal route in the optimal routes ("route 1" and "route 2") for which a search has been made. A comparison is made with respect to a node corresponding to the present vehicle state sequentially from the end terminal node of the optimal route having a high priority, and, under the condition that vehicle signals that differ from each other between the mutually compared nodes are operable through voice recognition, corresponding voice recognition dictionaries are sequentially brought into a standby state. When a voice is input from the vehicle occupant of the vehicle 200, those voice recognition dictionaries confirm whether words used for the input voice are included in a voice recognition dictionary having the highest priority, and, if words used for the input voice are not included therein, switching is performed among targeted voice recognition dictionaries in high-to-low order of priority.

In addition to the advantages (1) to (4) of the first exemplary embodiment, the second exemplary embodiment may achieve one or more of the following advantages.

(5) The agent ECU 100 is configured to perform switching between voice recognition dictionaries under the condition that a node corresponding to a vehicle state that has transitioned through a voice recognition process is included in a route predicted by the state predicting section 106. This increases the possibility that the voice recognition dictionary after switching will be actually used in a predicted future vehicle state, and therefore it is possible to improve voice recognition accuracy by switching between voice recognition dictionaries with high reliability.

(6) The agent ECU 100 is configured to predict a route while recognizing a node corresponding to a vehicle state that has transitioned through a voice recognition process in the past as an end terminal node so as to perform switching to a voice recognition dictionary that has been used for the transition to the end terminal node in the predicted route. Therefore, the recognition accuracy of the voice recognition process is made even higher by adapting the switching to a voice recognition dictionary suitable for a voice recognition process to the actual circumstances.

(7) The agent ECU 100 is configured to, if a plurality of nodes each of which corresponds to a vehicle state that has transitioned through a voice recognition process exist, set a priority for those nodes and so as to perform switching to a voice recognition dictionary used in a voice recognition process sequentially from a voice recognition dictionary that has been used for the transition to a set node having a high priority. Therefore, even if a plurality of nodes each of which corresponds to a vehicle state that has transitioned through a voice recognition process exist, it is possible to perform switching to a voice recognition dictionary suitable for those voice recognition processes, and therefore it is possible to improve general-purpose properties.

(8) The agent ECU 100 is configured to perform switching between voice recognition dictionaries under the condition that a vehicle signal that has the difference between a node corresponding to the present vehicle state and a node corresponding to a vehicle state that has transitioned through a voice recognition process is operable through a voice recognition process. Therefore, the recognition accuracy of a voice recognition process is improved by adapting the switching to a voice recognition dictionary suitable for the voice recognition process to the actual circumstances more appropriately.

Third Exemplary Embodiment

Next, a third exemplary embodiment of the vehicle state prediction system will be described with reference to FIGS. 10 to 14. The third exemplary embodiment differs from the first exemplary embodiment or from the second exemplary embodiment in that a prediction result of a future vehicle state is used to determine service start-up. Therefore, in the following description, for the illustrative purposes, a configuration that differs from that of the first exemplary embodiment is chiefly described, and the configuration that is the same or equivalent to that of the first exemplary embodiment is omitted to avoid a redundant description.

Figure 10:
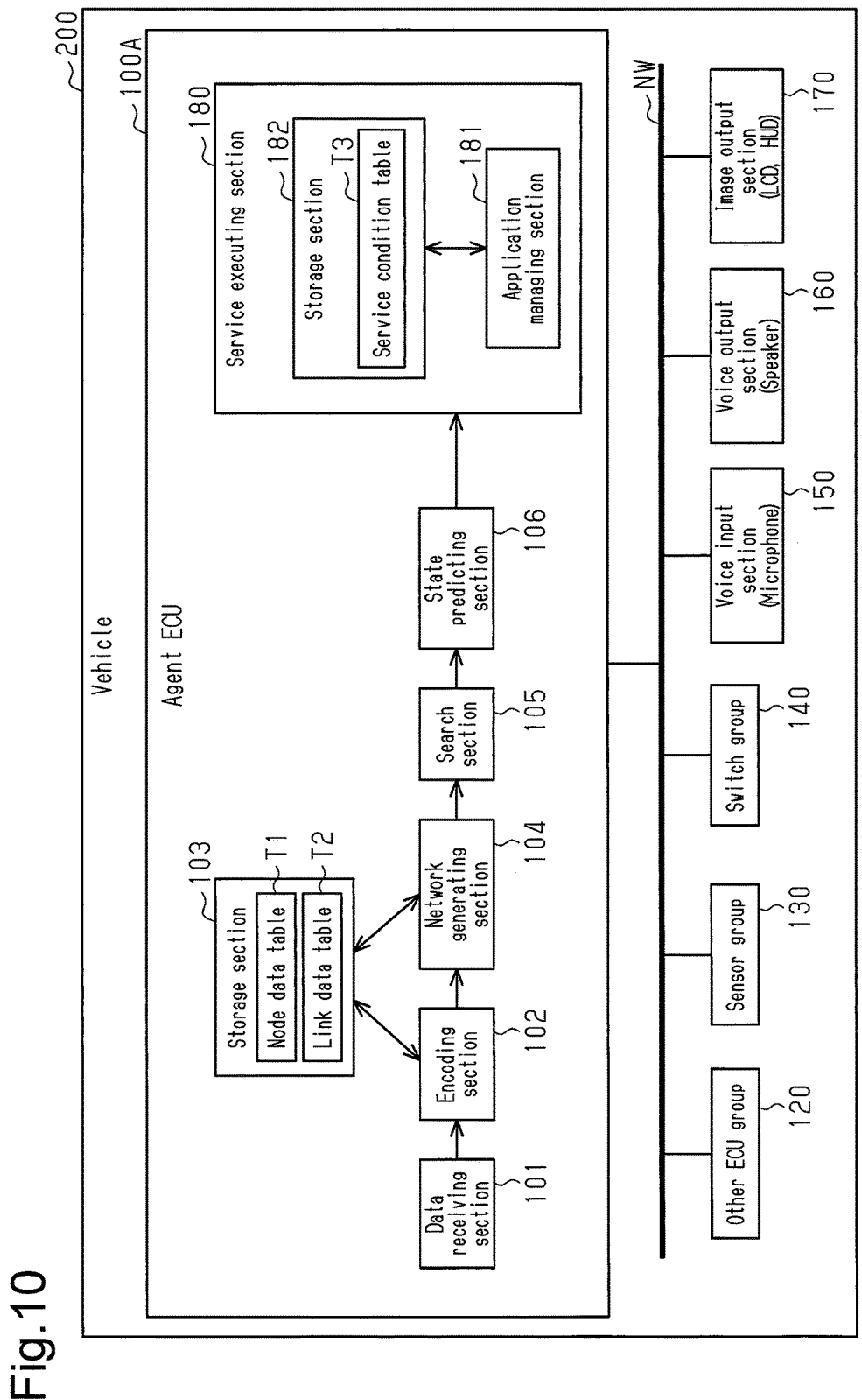
FIG. 10 is a block diagram showing a schematic configuration of a third exemplary embodiment of the vehicle state prediction system.

As shown in FIG. 10, in the third exemplary embodiment, the agent ECU 100A includes a service executing section 180, which executes one or more information providing services according to a vehicle state. When the start-up operation of a service is performed through the sensor group 130 or through the switch group 140, an application managing section 181 of the service executing section 180 extracts a corresponding service from one or more services stored in the storage section 182, and starts up and executes the service extracted therefrom. The service executed by the application managing section 181 is provided to the vehicle occupant of the vehicle 200 through the voice output section 160 or through the image output section 170.

The application managing section 181 is configured to collate a future vehicle state predicted by the state predicting section 106 with a service condition table T3 read out from the storage section 182 and so as to start up the corresponding service beforehand without performing any start-up operation when the collation is established.

As shown in FIG. 11, service types 310 of services to be collated, service start-up conditions 311 for those services, and vehicle states 312 after having executed those services are correlated with the service condition table T3. The service start-up condition 311 is formed by combining at least parts of a group of vehicle signals acquired from the other ECU group 120, from the sensor group 130, and from the switch group 140, and the combinations differ from each other depending on each service type. Likewise, the vehicle state after having executed the services is formed by combining at least parts of a group of vehicle signals acquired from the other ECU group 120, from the sensor group 130, and from the switch group 140, and the combinations differ from each other depending on each service type.

Figure 12:
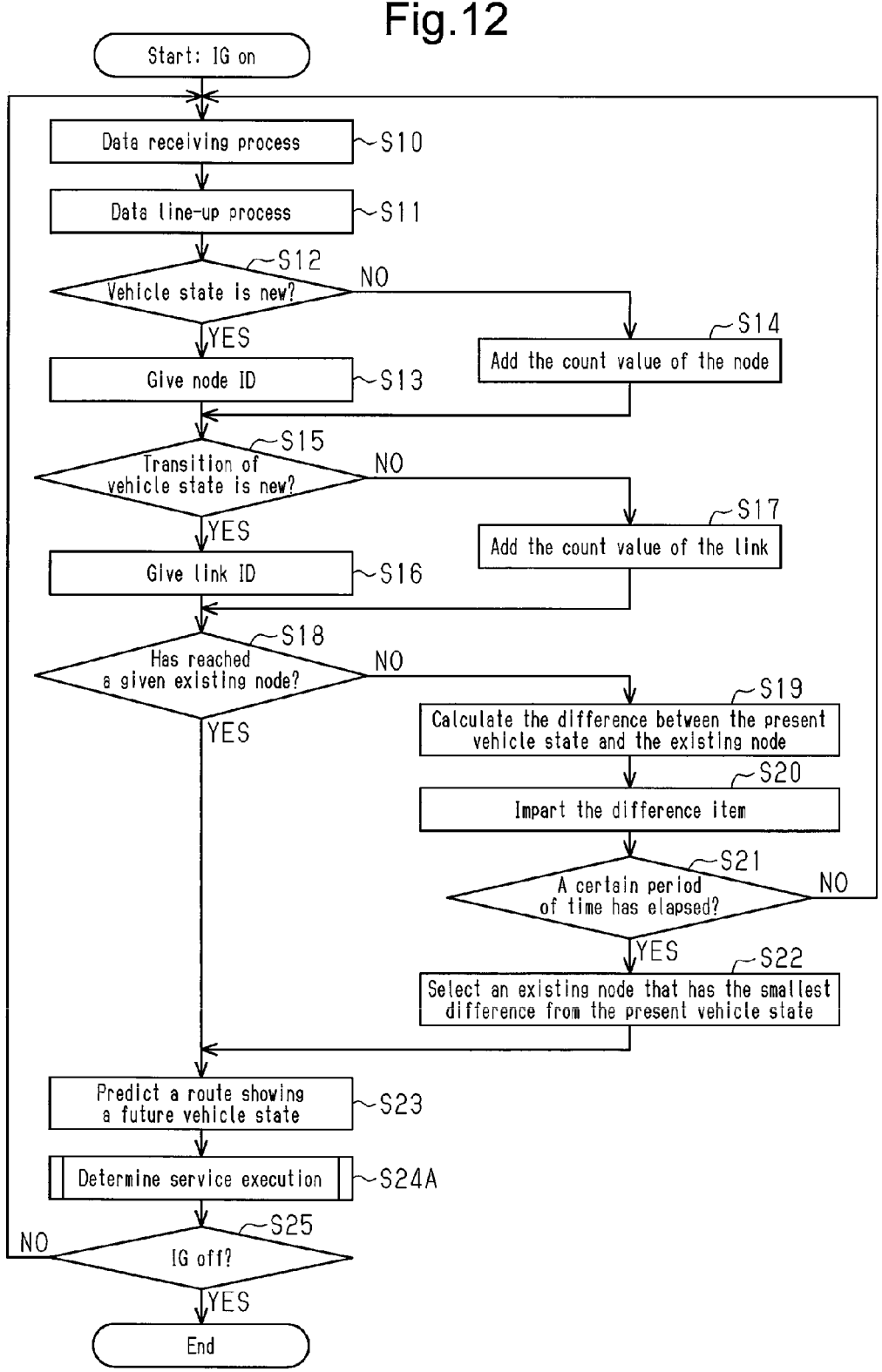
FIG. 12 is a flowchart showing a processing procedure of prediction processing executed by the vehicle state prediction system of the third exemplary embodiment.

Next, a specific processing procedure concerning a vehicle state prediction process performed by the agent ECU 100 will be described. As shown in FIG. 12, the third exemplary embodiment differs from the first exemplary embodiment in that a service execution determination process (step S24A) is performed in the prediction process of the third exemplary embodiment instead of the switching process for switching between the voice recognition dictionaries in step S24 of the flowchart of FIG. 7. Accordingly, this service execution determination process will be described with reference to FIG. 13.

Figure 13:
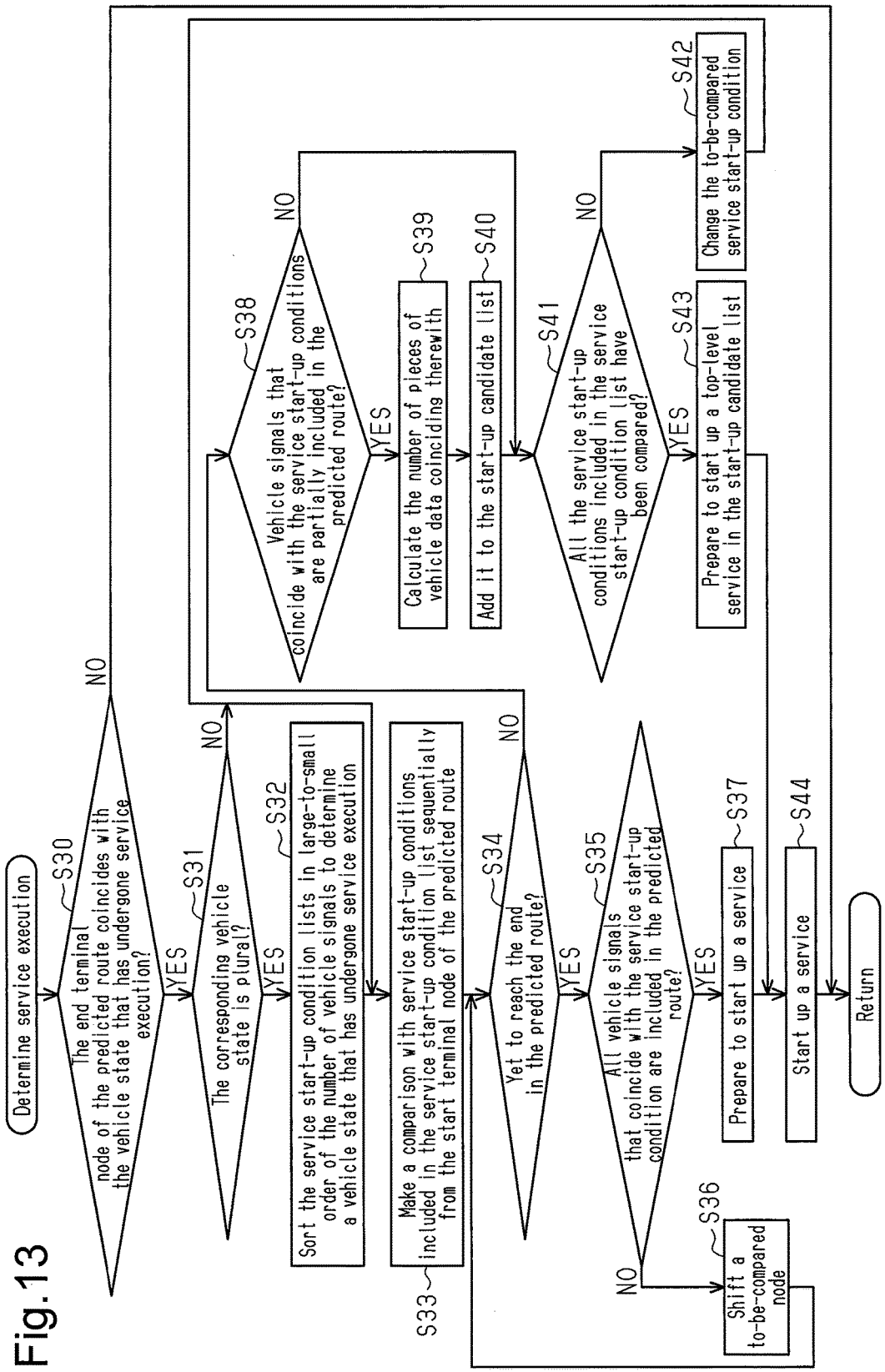
FIG. 13 is a flowchart showing a processing procedure of a service execution determination process.

As shown in FIG. 13, the agent ECU 100 first determines whether the end terminal node of a route predicted by the state predicting section 106 coincides with a vehicle state that has undergone service execution (step S30). In other words, if the end terminal node of the route predicted thereby and the vehicle state that has undergone service execution coincide with each other, there is also a possibility that this service will be executed during the transition of the vehicle state on the predicted route, and therefore step S30 is determined as a precondition to establish a service start-up condition. If the end terminal node of the route predicted thereby does not coincide with the vehicle state that has undergone service execution (step S30=NO), even the precondition to establish the service start-up condition is not satisfied, and therefore the service execution determination process of FIG. 13 is ended.

On the other hand, if the end terminal node of the route predicted thereby coincides with the vehicle state that has undergone service execution (step S30=YES), the agent ECU 100 determines whether there are two or more corresponding vehicle states (step S31). If there are two or more corresponding vehicle states (step S31=YES), service start-up condition lists are sorted in large-to-small order of the number of vehicle signals to determine the vehicle state that has undergone service execution (step S32). The reason is that it becomes difficult to satisfy the aforementioned precondition in proportion to an increase in the number of vehicle signals to determine a vehicle state that has undergone service execution, and therefore, concerning a service that satisfies this severe condition, the possibility that this service will be executed during the transition of a vehicle state on a predicted route is considered to become even higher.

Figure 14:
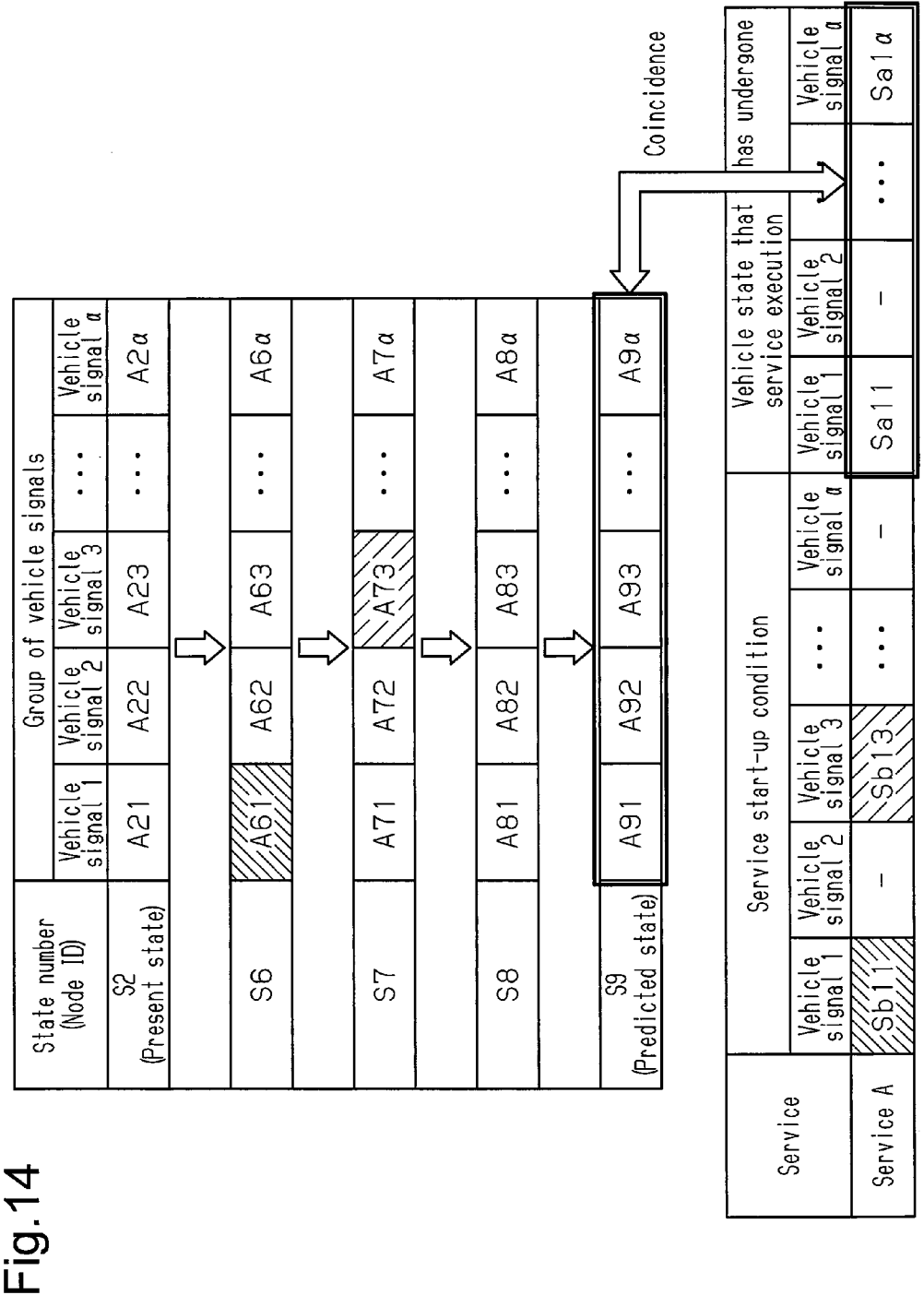
FIG. 14 is a schematic diagram to describe processing contents of the service execution determination process.

FIG. 14 shows one example of the processing contents of a service execution determination process intended for "service A." In the example of this drawing, the end terminal node of state number S9 of a route (state number S2→state number S6→state number S7→state number S8→state number S9) predicted by the state predicting section 106 coincides with a vehicle state that has undergone the execution of "service A." The number of vehicle signals to determine the corresponding vehicle state is two, i.e., "vehicle signal 1" and "vehicle signal α."

Thereafter, as shown in FIG. 13, a comparison is made with service start-up conditions included in the service start-up condition list sequentially from the start terminal node of the predicted route (step S33). If it yet to reach the end terminal node in the predicted route (step S34=YES), it is determined whether all the vehicle signals that coincide with the service start-up condition are included in the predicted route (step S35). If all the vehicle signals that coincide with the service start-up condition are not included therein (step S35=NO), nodes to be compared are shifted to the end terminal node side one by one (step S36). Thereafter, in a period in which it has not reached the end terminal node in the predicted route, it is repeatedly determined whether all the vehicle signals that coincide with the service start-up condition are included in the predicted route while the nodes to be compared are being shifted to the end terminal node side one by one. If all the vehicle signals that coincide with the service start-up condition are included therein during that period (step S35=YES), the start-up of a service to be compared at the present point in time is prepared (step S37), and then this service is started up (step S44). In other words, if the service start-up condition is established during the transition of the vehicle state on the predicted route, the execution of this service in the future is predicted. Therefore, in this situation, it is possible to improve convenience by starting in advance the start-up of a service without performing any start-up operation.

In the example of FIG. 14, concerning the start terminal node of the predicted route (state number S2), a vehicle signal that coincides with the service start-up condition of "service A" is not included. Thereafter, when a node to be compared is shifted (state number S2→state number S6), concerning this node of state number S6, "vehicle signal 1" is included as a vehicle signal that coincides with the service start-up condition of "service A." It should be noted that, concerning "vehicle signal 3" that serves as the service start-up condition of "service A," it has not yet been satisfied, and therefore a node to be compared is shifted again (state number S6→state number S7). Concerning this node of state number S7, "vehicle signal 3" is included as a vehicle signal that coincides with the service start-up condition of "service A." In this example, all the service start-up conditions of "service A" are included at this point in time, and therefore the start-up of "service A" starts to be prepared without further performing a determination process.

As shown in FIG. 13, if the end terminal node of the predicted route is reached in a state in which all the vehicle signals that coincide with the service start-up conditions are not included (step S34=NO), it is determined whether vehicle signals that coincide with the service start-up conditions are partially included in the predicted route (step S38). If vehicle signals that coincide therewith are partially included therein (step S38=YES), the number of vehicle signals that coincide therewith is calculated (step S39), and then services to be compared at the present point in time are added to the start-up candidate list (step S40), and the process is shifted to step S41. In other words, even if the service start-up condition is not completely established during the transition of a vehicle state on a predicted route, the possibility that this service will be executed in the future is fully conceivable if even one part of the vehicle signals is established. Therefore, in this situation, this service is included in advance in the start-up candidate list, and the start-up of this service is configured to start to be prepared according to a result of a comparison with other services.

If no vehicle signals that coincide with the service start-up condition are included in the predicted route (step S38=NO), the process is shifted to step S41 without undergoing the process of steps S39 and S40. In step S41, it is determined whether all the service start-up conditions included in the service start-up condition list have been compared. If not all the service start-up conditions have been compared (step S41=NO), the service start-up condition to be compared is changed (step S42), and then the process is returned to step S33. It is determined whether a service start-up condition concerning a service to be newly compared is established or not. On the other hand, if all the service start-up conditions have been compared (step S41=YES), the start-up of a top-level service in the start-up candidate list is prepared (step S43), and this service is started up (step S44).

In addition to the advantages (1) and (2) of the first exemplary embodiment, the third exemplary embodiment may achieve one or more of the following advantages.

(9) The agent ECU 100 is configured to include the service executing section 180, which is capable of executing one or more services accompanied by a transition of the vehicle state, and the service executing section 180 is configured to execute the services when a node included in a route predicted by the state predicting section 106 satisfies the service start-up condition. Therefore, a predicted service is performed without performing any vehicle operation while predicting a service executed in a future vehicle state. As a result, it is possible to provide a service conforming to the future vehicle state with convenience.

(10) Under the condition that an end terminal node in a route predicted by the state predicting section 106 coincides with a vehicle state that has undergone the execution of a service, the service executing section 180 is configured to determine the start-up condition of this service. Therefore, a targeted service is narrowed prior to a determination process of the service start-up condition, and it is possible to reduce a processing load in predicting a service executed in a future vehicle state.

(11) The service executing section 180 is configured to determine a service start-up condition sequentially from a service that is the greatest in the number of vehicle signals that determine a vehicle state that has undergone service execution. Therefore, even if there is a plurality of candidates of a service executed in a future vehicle state, it is possible to successively determine a start-up condition with respect to the service candidates, and it is possible to improve general-purpose properties and convenience.

Fourth Exemplary Embodiment

Next, a fourth exemplary embodiment of the vehicle state prediction system will be described with reference to FIGS. 15 to 17. The fourth exemplary embodiment differs from the first to third exemplary embodiments in that a prediction result of a future vehicle state is used to manage the power source of a sensor. Therefore, in the following description, for the illustrative purposes, a configuration that differs from that of the first exemplary embodiment is chiefly described, and the configuration that is the same or equivalent to that of the first exemplary embodiment is omitted to avoid a redundant description.

Figure 15:
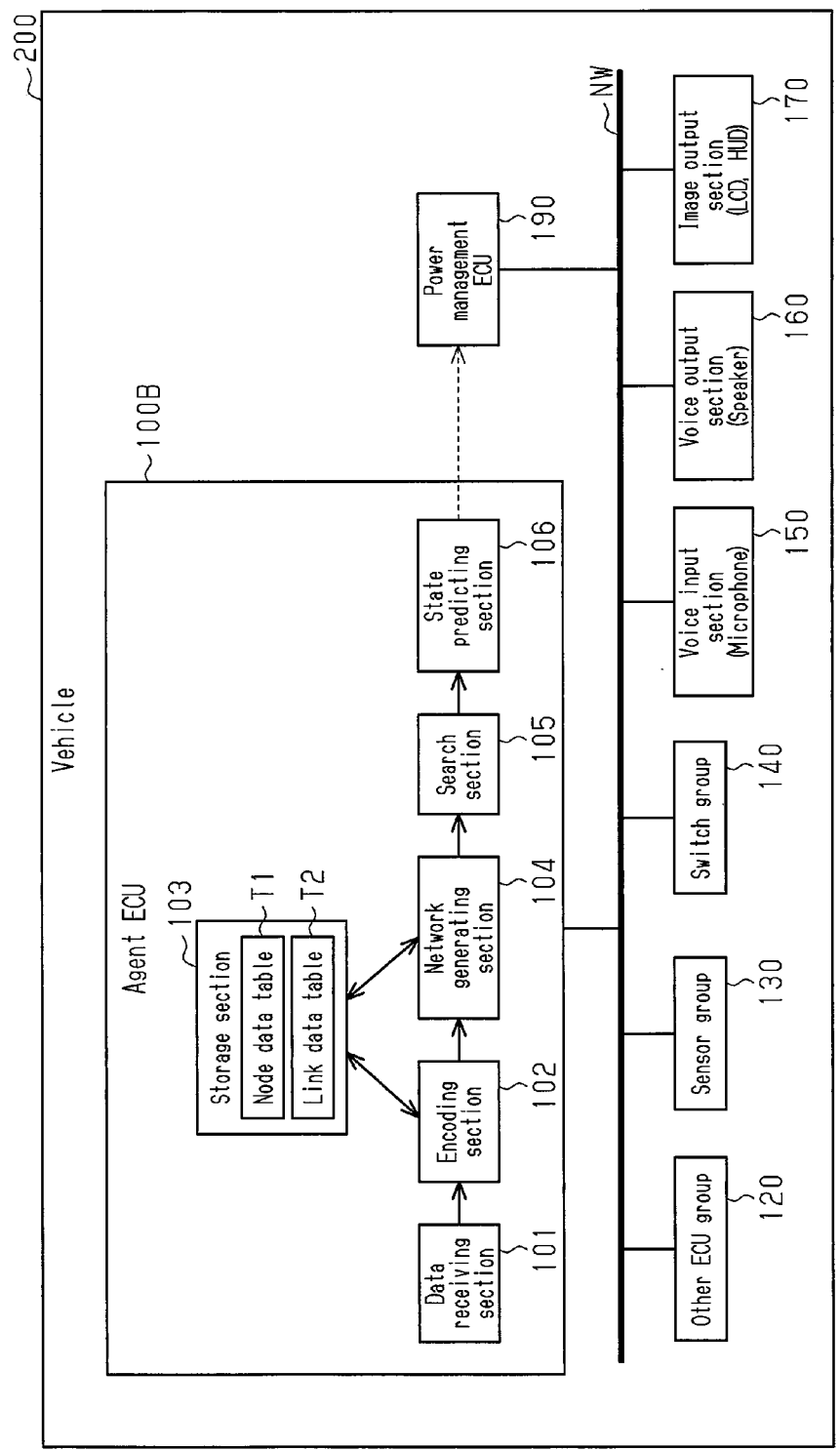
FIG. 15 is a block diagram showing a schematic configuration of a fourth exemplary embodiment of the vehicle state prediction system.

As shown in FIG. 15, in the fourth exemplary embodiment, the vehicle 200 includes a power management ECU 190 connected to the vehicle network NW. The power management ECU 190 manages the power source of various in-vehicle devices through the vehicle network NW. The power source of the in-vehicle devices is managed in consideration of a future vehicle state that is input from the state predicting section 106 of the agent ECU 100B. The power management ECU 190 may comprise various electric circuits.

Figure 16:
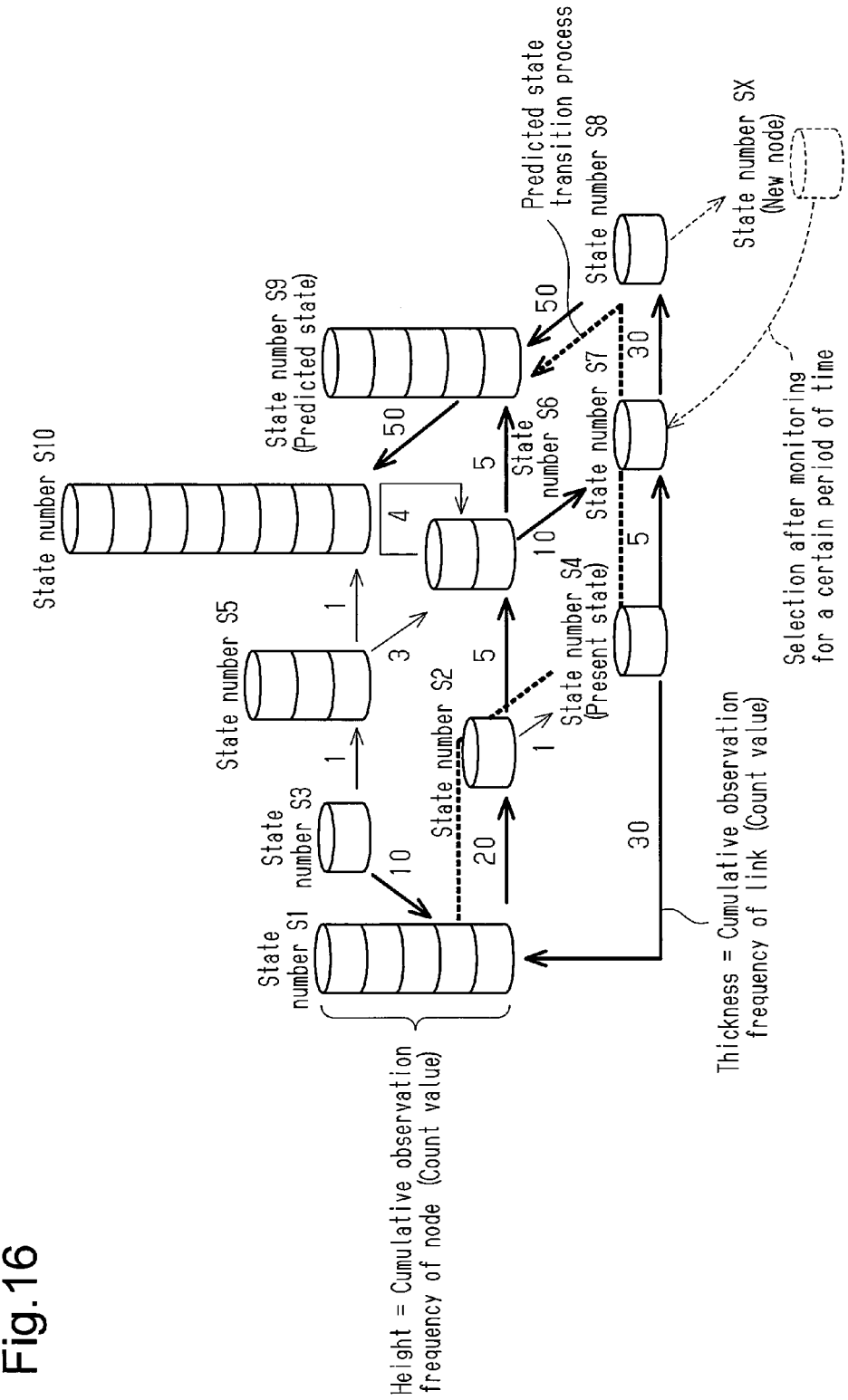
FIG. 16 is a schematic diagram showing one example of a network structure generated by the vehicle state prediction system of the fourth exemplary embodiment.

More specifically, in a network structure shown in, for example, FIG. 16, which corresponds to FIG. 6, a past vehicle state when the ignition switch was turned on to start network generation corresponds to the node of state number S1, and the present vehicle state corresponds to the node of state number S4, and the vehicle state that has been in the transition process from the past vehicle state to the present vehicle state corresponds to the node of state number S2. An optimal route (state number S4→state number S7→state number S8→state number S9) in which the node of state number S4 corresponding to the present vehicle state is set as a starting point is regarded as a route showing future changes in the vehicle state, and a search is made for this route.

On the other hand, FIG. 17 shows one example of changes in sensor values of various sensors from the node of state number S1 corresponding to a vehicle state when network generation is started to the end terminal node of state number S9 of a route predicted as a future vehicle state. In the example shown in this drawing, concerning "sensor value 3," the output is not detected in the node of state number S4, which corresponds to the present vehicle state, whereas the output is detected in the node of state number S8, which exists in the route predicted as a future vehicle state. In other words, concerning "sensor value 3," the node existing in the route predicted by the state predicting section 106 shows an output value that differs from that of the present vehicle state, and therefore the possibility that accurate detection will be required is high. Therefore, in this situation, the power management ECU 190 is configured such that, if the power source of a sensor that is the originator of acquisition of "sensor value 3" is set to OFF, the power source of this sensor is turned on without performing any vehicle operation. In the example shown in this drawing, concerning "sensor value 4," the output is not always detected during a period from the node of state number S1 corresponding to a vehicle state when network generation is started to the end terminal node of state number S9 of a route predicted as a future vehicle state. In other words, concerning "sensor value 4," the output value of the node is not changed both in the route from the node corresponding to the past vehicle state to the node corresponding to the present vehicle state and in the route predicted by the state predicting section 106, and the possibility that detection will become needless is high. Therefore, in this situation, the power management ECU 190 is configured such that, if the power source of a sensor, which is the originator of acquisition of "sensor value 4," is set to ON, the power source of this sensor is turned off without performing any vehicle operation.

In addition to the advantages (1) and (2) of the first exemplary embodiment, the fourth exemplary embodiment may achieve one or more of the following advantages.

(12) The power management ECU 190 is configured to set the power source of the sensor that detects a sensor value to OFF when the nodes in a route predicted by the state predicting section 106 include sensor values in which the output value is the same. In other words, if there is a sensor value that is predicted not to have a change in the output value in the future, the operation of the sensor that detects a sensor value supposedly becomes needless, and therefore it is possible to reduce power consumption of the whole system by setting in advance the power source of this sensor to OFF.

(13) The conditions for setting the power source of the sensor to OFF further include a condition that the output value of a vehicle signal is not changed in both nodes in a route from a node corresponding to the past vehicle state to a node corresponding to the present vehicle state. Therefore, it is possible to reduce power consumption of the whole system while selecting vehicle signals to be excluded from among to-be-detected vehicle signals even more discreetly.

(14) The power management ECU 190 is configured to set the power source of the sensor that detects a sensor value to ON when a node in a route predicted by the state predicting section 106 includes a sensor value showing an output value differing from that of the present vehicle state. In other words, it is possible to accurately perform a detection operation by starting in advance the operation of the sensor that detects a sensor value when there is a sensor value predicted to have a change in the output value.

Fifth Exemplary Embodiment

Next, a fifth exemplary embodiment of the vehicle state prediction system will be described with reference to FIGS. 18 to 21. The fifth exemplary embodiment differs from the first to fourth exemplary embodiments in that a management center that manages traveling information on a plurality of vehicles predicts a future vehicle state. Therefore, in the following description, for the illustrative purposes, a configuration that differs from that of the first exemplary embodiment is chiefly described, and the configuration that is the same or equivalent to that of the first exemplary embodiment is omitted to avoid a redundant description.

The vehicle state prediction system of the fifth exemplary embodiment is configured to be located in the management center, and to generate a network structure by use of vehicle signals received from a plurality of targeted vehicles, and to deliver a future vehicle state predicted by use of the network structure to each vehicle. Each vehicle is configured to improve the accuracy of voice recognition by means of the agent ECU by bringing in advance a voice recognition dictionary suitable for a future vehicle state delivered thereby into a standby state.

Figure 18:
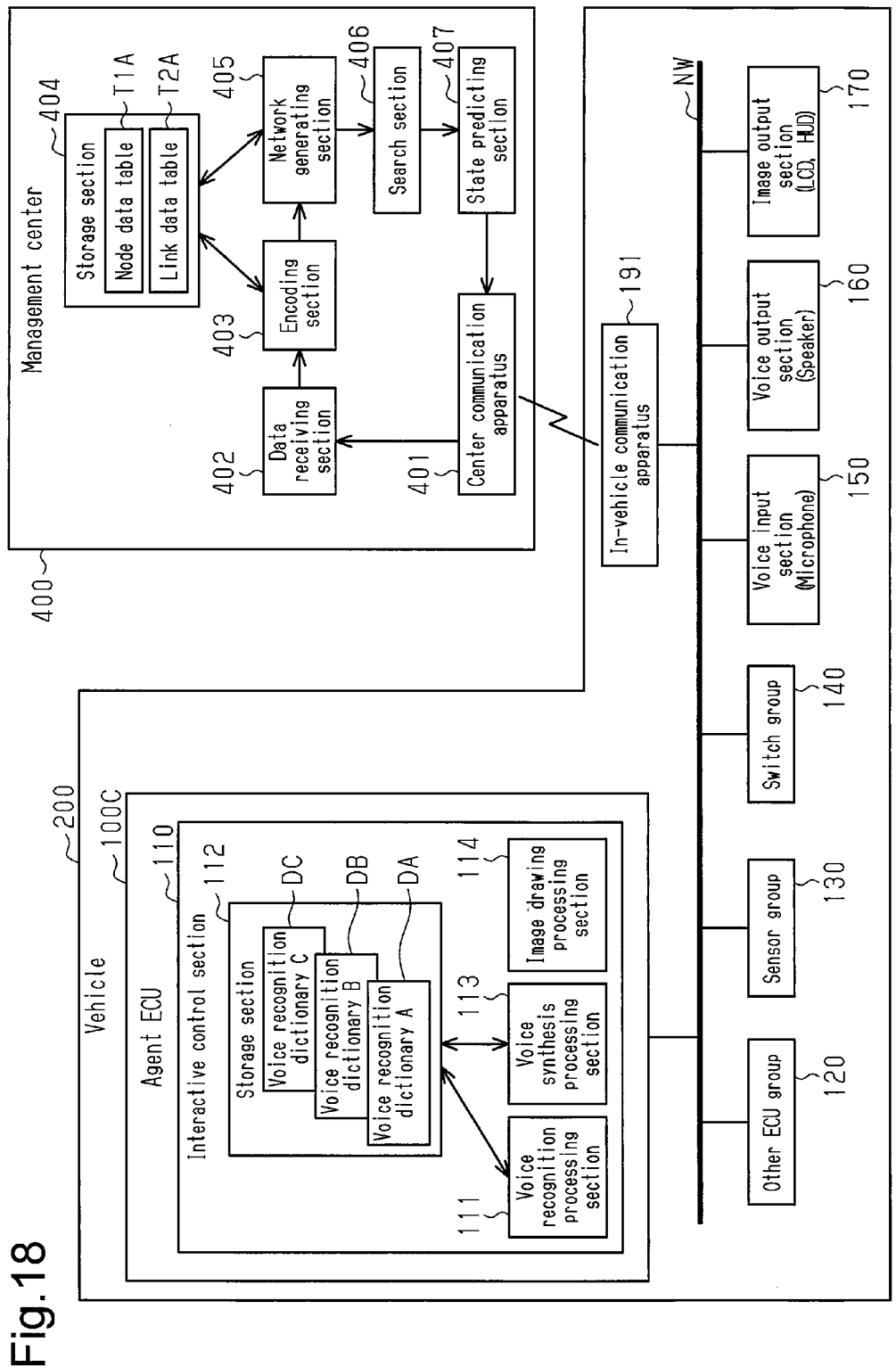
FIG. 18 is a block diagram showing a schematic configuration of a fifth exemplary embodiment of the vehicle state prediction system.

More specifically, as shown in FIG. 18, the vehicle 200 transmits vehicle signals, which are output to the vehicle network NW from the other ECU group 120, from the sensor group 130, and from the switch group 140, to the management center 400 through an in-vehicle communication apparatus 191.

The management center 400 includes a center communication apparatus 401, which communicates various pieces of information including the aforementioned vehicle signals between the in-vehicle communication apparatus 191 and the center communication apparatus 401. The management center 400 inputs a vehicle signal received from the vehicle 200 through the center communication apparatus 401 to an encoding section 403 via a data receiving section 402. The encoding section 403 encodes a vehicle state by use of vehicle signals input therefrom, and stores information on symbols generated by use of those vehicle signals in a storage section 404. The encoding section 403 and the storage section 404 may each comprise various electric circuits.

The management center 400 includes a network generating section 405, which generates a network structure. In the network structure, symbols each of which represents an encoded vehicle state are each defined as a node in order of appearance and transitions between those nodes are defined as links. When the network structure is generated, the network generating section 405 rewrites and updates information on the defined node onto a node data table T1A stored in the storage section 404, and rewrites and updates information on the defined link onto a link data table T2A stored in the storage section 404. The network generating section 405 may comprise various electric circuits.

As shown in FIG. 19, state numbers 502 (node ID) of encoded vehicle states, groups 503 of vehicle signals that define those vehicle states, and count values 504 of the number of appearances of a vehicle state (node) are correlated with the node data table T1A in a manner in which a division is made according to vehicle types 501 of vehicles. In the node data table T1A of this drawing, the number of state numbers of encoded vehicle states is added whenever a new state number is given in the encoding section 403. The count values 504 correlated with these state numbers 502 are accumulated whenever a corresponding state number is given as an existing state number in the encoding section 403. Even when vehicle signals are received from a plurality of vehicles, a common state number 502 will be given to a vehicle state, and the count values 504 will also be summed up if the vehicle types of those vehicles are the same and if the groups 503 of vehicle signals each of which defines a vehicle state are also the same.

The link data table T2A shown in FIG. 20 is configured such that link IDs 506, which corresponds to the transition between encoded vehicle states, start terminal node IDs 507, each of which represents a state number of a vehicle state that has not yet undergone a transition, end terminal node IDs 508, each of which represents a state number of a vehicle state that has undergone a transition, and count values 509 of the number of transitions (the number of passages) between vehicle states are correlated in a manner in which a division is made according to vehicle types 505 of vehicles. In the link data table T2A, the number of link IDs 506 is accumulated whenever the transition to those state numbers is new regardless whether a state number encoded in the encoding section 403 is either a new state number or an existing state number. The count values 509 correlated with the link IDs 506 are accumulated whenever the transition to a state number encoded in the encoding section 403 is an existing one. Even when vehicle signals are received from a plurality of vehicles, a common link ID 506 will be given to the transition of a vehicle state, and the count values 509 will also be summed up if the vehicle types of those vehicles are the same and if the vehicle state that has not yet undergone a transition and the vehicle state that has undergone a transition are the same.

Figure 21:
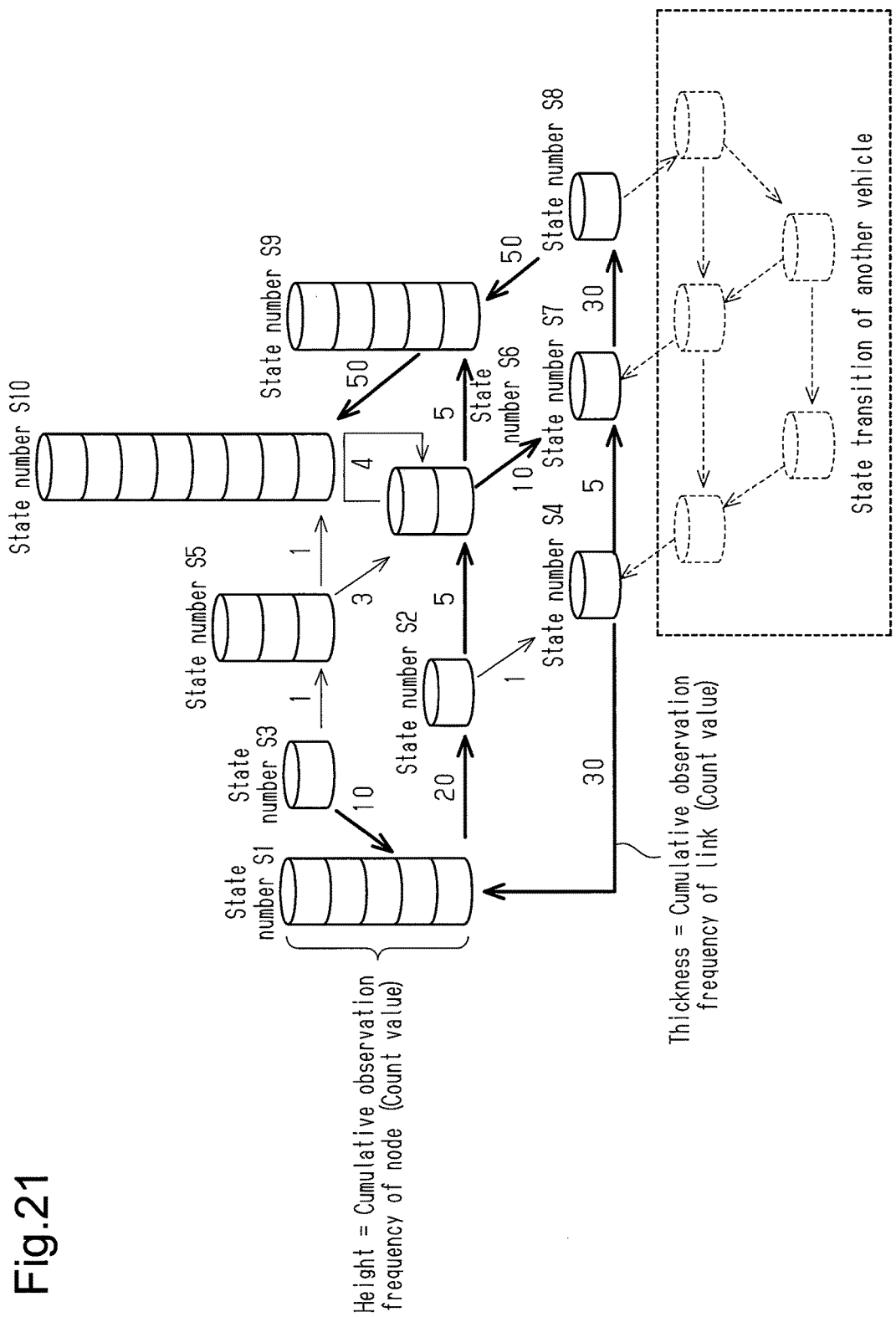
FIG. 21 is a schematic diagram showing one example of a network structure generated by the vehicle state prediction system of the fifth exemplary embodiment.

FIG. 21 shows one example of a network structure generated in the aforementioned manner, in which a network part generated on the basis of a vehicle signal of one vehicle is shown by the solid line and in which a network part generated on the basis of a vehicle signal of another vehicle is shown by the broken line. As shown in this drawing, the network structure is formed by use of a plurality of vehicle signals. Therefore, the range of the network structure is made wider than in a case in which the network structure is formed only by one vehicle.

As shown in FIG. 18, the management center 400 makes a search for an optimal route based on a predetermined algorithm through the search section 406 among a plurality of routes from a node corresponding to the present vehicle state to a node corresponding to a vehicle state that has undergone transitions a predetermined number of times in a generated network structure. The management center 400 predicts a vehicle state corresponding to a node existing in a searched optimal route as a future vehicle state through the state predicting section 407, and delivers the predicted future vehicle state to each vehicle 200 through the center communication apparatus 401. The search section 406 and the state predicting section 407 may each comprise various electric circuits.

Thereafter, an agent ECU 100C of the vehicle 200 receives a prediction result of a delivered future vehicle state from the management center 400 through the in-vehicle communication apparatus 191, and, based on a received prediction result, selects a voice recognition dictionary suitable for the future vehicle state from among the voice recognition dictionaries DA to DC stored in the storage section 112, and brings in advance the voice recognition dictionary suitable therefor into a standby state.

In addition to the advantages (1) to (4) of the first exemplary embodiment, the fifth exemplary embodiment may achieve one or more of the following advantages.

(15) The management center 400 defines, as a node, a vehicle state based on vehicle signals whenever the vehicle signals are received from a plurality of vehicles, generates the aforementioned network structure, and sums up accumulated values of the nodes and links in the plurality of vehicles in the generated network structure. It is configured to predict a route showing future changes in the vehicle state based on the generated network structure and so as to deliver a predicted route to each vehicle. In this case, the network structure is generated in a manner in which histories of the transitions of vehicle states in the plurality of vehicles are shared. Therefore, there is also a case in which, even if a vehicle state is a new one in one vehicle, the vehicle state is an existing one in another vehicle, and it becomes easier to widen the range of the network structure than in a case in which the network structure is generated for each vehicle. Therefore, it is possible to improve general-purpose properties and practicality when a future vehicle state is predicted on the basis of the network structure.

Other Exemplary Embodiments

The above described exemplary embodiments may be modified as follows.

The first exemplary embodiment or the fifth exemplary embodiment may perform switching between the voice recognition dictionaries DA to DC under the condition that a route predicted by the state predicting sections 106 and 407 includes a node corresponding to a vehicle state that has undergone a transition through a voice recognition process.

When a search is made for a plurality of optimal routes, the second exemplary embodiment may employ the following manners to set the priority with respect to those routes. In detail, a high priority may be set in large-to-small order of the count values of links that form a route, or a high priority may be set in large-to-small order (or small-to-large order) of the count values of nodes that form a route. Among those routes, the product or quotient of the count values of nodes forming a route with respect to the count values of links forming the route may be calculated, and a high priority may be set in large-to-small order (or small-to-large order) of calculation values.

In the third exemplary embodiment, if there is a plurality of services in each of which the end terminal node of a route predicted by the state predicting section 106 coincides with a vehicle state that has undergone service execution, all of those services may be started up and executed.

In the third exemplary embodiment, whether the end terminal node of a route predicted by the state predicting section 106 coincides with a vehicle state that has undergone service execution may be excluded from the precondition for determining the service start-up condition. In other words, it may be all-inclusively determined whether a vehicle state that exists in a route predicted by the state predicting section 106 satisfies a service start-up condition of a service included in the service condition table T3.

In the third exemplary embodiment, only when all vehicle signals that coincide with a service start-up condition are included in a route predicted by the state predicting section 106, the start-up and execution of this service may be performed.

In the fourth exemplary embodiment, as criteria when the power source of the sensor is set to ON, the transition process of a vehicle state from the past to the present may be considered in addition to the transition process of a vehicle state existing in a route predicted by the state predicting section 106.

In the fourth exemplary embodiment, a past vehicle state that is employed as a criterion when the power source of a sensor is set to OFF may be an arbitrary vehicle state, such as a vehicle state after the vehicle starts to travel or a vehicle state when the navigation device starts route guiding, without being limited to a vehicle state when the ignition switch is operated.

The fourth exemplary embodiment may consider only a vehicle state existing in a route predicted by the state predicting section 106 as a criterion when the power source of the sensor is set to OFF, without considering the transition process of a vehicle state from the past to the present.

The fifth exemplary embodiment may common pieces of information on nodes and links managed by the management center 400 among all vehicle types, without dividing the pieces of information according to the type of the vehicle that is the originator of acquisition of a vehicle signal.

Each of the above exemplary embodiments may rewrite and update a value obtained by subtracting the count value of a link from a predetermined reference value as a piece of link information forming a network structure. In this configuration, among a plurality of routes from a node corresponding to the present vehicle state to a node corresponding to a vehicle state that has undergone transitions a predetermined number of times, the fact that a route that is the greatest in the count value of links that exist in those routes is found and the fact that a route that is the smallest in the count value of link information that exists in those routes is found are equated with each other. Therefore, if this link information is used as a parameter, it is possible to apply predetermined algorithms for use in a search for an optimal route, such as Dijkstra's algorithm and A* (A star) algorithm each of which is a kind of solution for an optimization problem (so-called shortest route problem) in which a route having minimum weight is found from among routes each of which connects two nodes to each other in the network, and a route showing future changes in the vehicle state is swiftly calculated.

In each of the above exemplary embodiments, the following method may be employed as a search method for an optimal route. In detail, among a plurality of routes from a node corresponding to the present vehicle state to a node corresponding to a vehicle state that has undergone transitions a predetermined number of times, a route that is greatest in the count value of nodes that exist in those routes and a route that is greatest in the count value of nodes and links that exist in those routes may be searched as an optimal route.

In each of the above exemplary embodiments, the following condition may be employed as a search end condition when a search is made for the optimal route. In detail, a search for the optimal route may be ended when the count value of nodes forming a searched route becomes greater than a threshold value, or when the count value of links forming a searched route becomes greater than a threshold value, or when the count value of nodes and of links forming a searched route becomes greater than a threshold value.

Each of the above exemplary embodiments may employ a structure that includes non-directional links as a network structure. Moreover, in each of the above exemplary embodiments, time-series information of a single vehicle signal may be used to determine a vehicle state.

While not restricted thereto, an exemplary embodiment can be embodied as computer-readable code on a computer-readable recording medium. The computer-readable recording medium is any data storage device that can store data that can be thereafter read and executed by a computer system or microprocessor. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs.

The first to fifth exemplary embodiments can be each carried out by combining the configurations and the functions together while including any of the modifications mentioned above.

The invention claimed is:

1. A vehicle state prediction system comprising:
a processor configured to encode a vehicle state by use of time-series information of one or more vehicle signals;
wherein the processor is further configured to define symbols representing the encoded vehicle state as nodes in order of appearance, wherein the processor defines transitions between the nodes as links and generates a network structure by accumulating a number of appearances of the nodes and a number of passages of the links; and
wherein the processor is further configured to predict a transition path showing a future change in the vehicle state from among a plurality of transition paths from a first node to a second node, wherein
the first node corresponds to the current vehicle state,
the second node corresponds to the vehicle state after transitioning a predetermined number of times from the first node,
the processor is further configured to predict, as the transition path showing the future change in the vehicle state, a transition path in which at least one of an accumulated value of the node that exists in the plurality of transition paths and an accumulated value of the link that exists in the plurality of transition paths is greatest, from among the plurality of transition paths.

2. The vehicle state prediction system according to claim 1, wherein the processor is further configured to predict, as the transition path showing a future change in the vehicle state, a transition path that is greatest in the number of passages of the links existing in the plurality of transition paths from the first node to the second node.

3. The vehicle state prediction system according to claim 1, wherein
existing nodes form the network structure, and
when the vehicle state does not transition to a vehicle state corresponding to the existing nodes even if a certain period of time elapses from a point in time at which the vehicle state does not correspond to any of the existing nodes, the processor is further configured to predict the transition path showing a future change in the vehicle state while setting, as a starting point, a node corresponding to a vehicle state that has a least difference from that of a present point in time among the existing nodes.

4. The vehicle state prediction system according to claim 1, further comprising:
a plurality of audio databases, in which voice pattern groups that differ from each other are stored; and
wherein the processor is further configured to perform a transition of a vehicle state through a voice recognition process,
wherein the processor is further configured to:
perform the voice recognition process by collating an input voice with an audio database selected from among the audio databases, and
perform switching from the audio database to another audio database suitable for a vehicle state included in a transition path predicted by the processor.

5. The vehicle state prediction system according to claim 4, wherein, if a transition path predicted by the processor includes a node corresponding to a vehicle state that has undergone a transition through the voice recognition process, the processor is configured to switch the audio database.

6. The vehicle state prediction system according to claim 5, wherein the processor is further configured to predict the transition path showing a future change in the vehicle state by defining, as the second node, a node corresponding to a vehicle state that underwent a transition through the voice recognition process in the past, and
the processor is further configured to perform switching from the audio database to an audio database that was used for the transition to the second node in the transition path predicted by the processor.

7. The vehicle state prediction system according to claim 6, wherein
when there are a plurality of nodes each of which corresponds to a vehicle state that has undergone a transition through the voice recognition process, the processor is further configured to set and give the plurality of nodes a priority higher in proportion to a decrease in node-to-node distance,
the audio database is used for a transition to the node, and
the processor is configured to perform switching among audio database used for the voice recognition process sequentially from the audio database that has been used for the transition to the node having a high priority given by the processor.

8. The vehicle state prediction system according to claim 5, wherein
the vehicle signal is different between the first node and the second node, and
the processor is further configured to perform switching between the audio databases under a condition that the vehicle signal is operable through the voice recognition process.

9. The vehicle state prediction system according to claim 1, wherein the processor is capable of executing one or more services accompanied by a transition of the vehicle state,
wherein the processor is further configured to execute the one or more services when a node included in the transition path predicted by the processor satisfies a predetermined service start-up condition.

10. The vehicle state prediction system according to claim 9, wherein the processor is further configured to determine the service start-up condition under a condition that an end terminal node in the transition path predicted by the processor coincides with a vehicle state for which a predetermined service has been executed.

11. The vehicle state prediction system according to claim 10, wherein
the vehicle signal determines the vehicle state for which a service has been executed, and
when an end terminal node in the transition path predicted by the processor coincides with the vehicle state for which a service has been executed in each of the plurality of services, the processor is further configured to determine the service start-up condition sequentially from a service that is greatest in number of the vehicle signals that determine the vehicle state for which a service has been executed.

12. The vehicle state prediction system according to claim 1, further comprising a power managing controller, which manages a power source of a sensor that detects a vehicle signal, wherein
an output value of a vehicle signal is acquired from each of the nodes, and when the output value of the vehicle signal does not change between the nodes in the transition path predicted by the processor, the power managing controller is configured to set the power source of the sensor that detects the vehicle signal to OFF.

13. The vehicle state prediction system according to claim 12, wherein
a second transition path leads from a node corresponding to a past vehicle state to a node corresponding to the current vehicle state, and
the power managing controller is configured to set the power source of the sensor to OFF further under the condition that the output value of the vehicle signal does not change between nodes in the second transition path.

14. The vehicle state prediction system according to claim 1, further comprising a power managing controller, which manages a power source of a sensor that detects a vehicle signal, wherein
an output value of a vehicle signal is acquired from each of the nodes, and
when a node in the transition path predicted by the processor includes a vehicle signal showing an output value different from that of the current vehicle state, the power managing controller is configured to set the power source of the sensor that detects the vehicle signal to ON.

15. The vehicle state prediction system according to claim 1, further comprising a management center, which manages traveling information of a plurality of targeted vehicles through wireless communication, wherein
the processor is located in the management center,
the processor is further configured to generate the network structure by defining vehicle states based on the current vehicle signals received from a plurality of vehicles as nodes, and
the processor is further configured to add accumulated values of the nodes in the plurality of vehicles to the accumulated values of the links in the network structure,
the processor is further configured to predict a transition path showing a future change in the vehicle state based on the network structure, and
the processor is further configured to deliver the transition path predicted by the processor to each vehicle of the plurality of vehicles.

16. A vehicle state prediction system comprising:
at least one memory comprising computer executable instructions;
at least one processor configured to read and execute the computer executable instructions to perform:
encoding a vehicle state by compiling time-series information of one or more vehicle signals;
defining symbols representing the encoded vehicle state as nodes in order of appearance defining transitions between the nodes as links;
generating a network structure by accumulating a number of appearances of the nodes and a number of passages of the links; and
predicting a transition path showing a future change in the vehicle state from among a plurality of transition paths from a first node to a second node,
wherein the predicting comprises predicting the transition path in which at least one of an accumulated value of the node that exists in the plurality of transition paths and an accumulated value of the link that exists in the plurality of transition paths is greatest, from among the plurality of transition paths.

17. The vehicle state prediction system according to claim 16 wherein the predicting comprises predicting, as the transition path showing a future change in the vehicle state, a transition path that is greatest in the number of passages of the links existing in the plurality of transition paths from the first node to the second node.

18. The vehicle state prediction system according to claim 16, wherein the at least one processor is further configured to read and execute the computer executable instructions to perform:
when the vehicle state does not transition to a vehicle state corresponding to existing nodes in the network structure, predicting the transition path showing a future change in the vehicle state while setting, as a starting point, a node corresponding to a vehicle state that has a least difference from that of a present point in time among the existing nodes.

19. The vehicle state prediction system according to claim 16, further comprising:
a plurality of audio databases, in which voice pattern groups are stored, wherein the at least one processor is further configured to read and execute the computer executable instructions to perform:
enabling a transition of a vehicle state through a voice recognition process;
performing the voice recognition process by collating an input voice with an audio database selected from among the audio databases, and
performing switching from the audio database to another audio database suitable for a vehicle state included in the predicted transition path.

20. The vehicle state prediction system according to claim 16, wherein the at least one processor is further configured to read and execute the computer executable instructions to perform:
executing one or more services accompanied by a transition of the vehicle state when a node included in the transition path predicted by the processor satisfies a predetermined service start-up condition.

21. The vehicle state prediction system according to claim 1, further comprising:
a plurality of audio databases, in which voice pattern groups that differ from each other are stored,
wherein the processor is further configured to perform switching from one audio database to another audio database suitable for a vehicle state included in a transition path predicted by the processor.

* * * * *